(12) United States Patent
Young et al.

(10) Patent No.: US 6,966,060 B1
(45) Date of Patent: Nov. 15, 2005

(54) METHOD AND SYSTEM FOR REMOTE CLIENT INSTALLATION

(75) Inventors: Jeff Young, Bellevue, WA (US); Bruce W. Copeland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 09/599,156

(22) Filed: Jun. 21, 2000

Related U.S. Application Data

(60) Provisional application No. 60/142,099, filed on Jul. 2, 1999.

(51) Int. Cl.[7] ............................................. G06F 9/445
(52) U.S. Cl. ...................... 717/177; 717/172; 709/203; 709/220; 709/223; 713/2
(58) Field of Search ............................... 717/168–178; 709/203, 220, 223; 713/1–2

(56) References Cited

U.S. PATENT DOCUMENTS

| | | | | | |
|---|---|---|---|---|---|
| 5,809,251 A | * | 9/1998 | May et al. | ................... | 709/223 |
| 5,860,012 A | * | 1/1999 | Luu | ........................... | 717/175 |
| 5,881,236 A | * | 3/1999 | Dickey | ........................ | 709/221 |
| 5,995,756 A | * | 11/1999 | Herrmann | ................... | 717/178 |
| 6,075,943 A | * | 6/2000 | Feinman | ..................... | 717/175 |
| 6,317,826 B1 | * | 11/2001 | McCall et al. | ................. | 713/1 |
| 6,457,175 B1 | * | 9/2002 | Lerche | ........................ | 717/173 |
| 2001/0003824 A1 | * | 6/2001 | Schnier | ...................... | 709/203 |

OTHER PUBLICATIONS

"Microsoft Press Computer Dictionary: Third Edition", Microsoft Press, 1997. pp. 27, 384, 430, and 489.*

\* cited by examiner

*Primary Examiner*—Antony Nguyen-Ba
(74) *Attorney, Agent, or Firm*—Law Offices of Albert S. Michalik, PLLC

(57) ABSTRACT

A method and system to remotely install management software on client machines of a network without requiring user-intervention such as a logon. A data discovery manager determines which discovered machines in a network should be configured for client installation, and queues a client configuration request (CCR) for each such machine. A client configuration manager dequeues each CCR, and attempts to establish a connection with the remote machine corresponding to the CCR. If successful, a bootstrap install service is downloaded to the client machine from a server having administrative rights, after which the bootstrap service is run to install the remainder of the management software on the client machine from a client access point server. If unsuccessful, retries may be attempted. Client machines having users with sufficient security rights may install the management software via a logon or other process at the client machine.

47 Claims, 25 Drawing Sheets

METHOD AND SYSTEM FOR REMOTE CLIENT INSTALLATION

This application claims the benefit of Ser. No. 60/142,099, filed Jul. 2, 1999.

FIELD OF THE INVENTION

The invention relates generally to computer systems, and particularly to installing client computer systems in a computer network.

BACKGROUND OF THE INVENTION

Many enterprises having computer networks want their client computers to be carefully managed by an administrator or the like from a central location. Such centralized management includes deploying applications to the client computers, maintaining and upgrading applications, and removing other applications.

However, before a client computer can be centrally managed, it is necessary to install management software on the client machine. This process is generally referred to as "Client Installation." When dealing with relatively small networks, it is possible for administrators to personally visit each client computer and install and management software thereon. However, as networks grow, e.g., on the order of many thousands of machines, visiting each machine becomes impractical, if not impossible. Teams of installers have been employed for this purpose, however this has its own drawbacks, including significant expense.

Attempts to automate client installation have heretofore still required considerable manual intervention at the client machine. In the most common form of this manual intervention, each end user is required to log onto the computer system, which causes pre-configured logon scripts to run. The scripts then handle the installation of the management software. As another common alternative, the user may manually connect to a server from the client machine, and execute a batch file or executable program to initiate the installation of client software.

A first problem with this "logon script" method of installing the management software on client computers is that administrators do not have an automated and scalable way to initiate the installation. For example, if an administrator knows of the existence of a group of computers, and wants to install management software agents on those computers, the administrator has to wait for actions to occur on the local machine, i.e., a user logon or user connection to a server and execution of a batch file. The running of logon scripts is rather unpredictable, as some systems, especially servers, rarely have users logging onto them, some systems are not configured to run logon scripts, and some systems have users logged on for extended periods of time before logging off and logging back on again. The manual running of a batch file is also not very desirable, as many users are unable or unwilling to perform this task.

Another drawback to logon script installation is that after the user begins the process of logging onto the machine, the use of logon scripts for the time-consuming task of installing and/or configuring software causes potentially unacceptable delays before a user is able to begin using the computer. Moreover, logon scripts cannot always be hidden from the user during execution, which allows the user to interfere with the execution of the logon script, and/or call for support merely to ask why the script is running. Interfering with the logon script defeats the very purpose of client management, while calls to a support desk to inquire about scripts are expensive and needless.

Moreover, the server is still highly involved in manual installations, which causes other problems, including security and scalability issues. More particularly, for complete installation of management software onto client machines, the servers are configured with a security account having "Administrator" rights of all client machines. This presents a security concern, because access to such an account allows remote access to virtually all aspects of all client machines. Also, to configure the client machines, the ratio of servers to client machines can be one-to-a thousand or more, and the work performed by the server can only be done to a very small number of clients at a time. A bottleneck often results from this scalability problem.

SUMMARY OF THE INVENTION

Briefly, the present invention provides a method and system to install management software on client machines without requiring client-side action (e.g., user-intervention). A data discovery manager running on a server determines via a set of rules which discovered machines in a network should be configured for client installation, and queues a client configuration request (CCR) for each such machine. A client configuration manager running on a server dequeues each CCR, and attempts to establish a connection with the remote machine corresponding to the CCR. If unsuccessful, (e.g., because of no connection or improper security rights), the CCR is placed in a retry queue for later attempts to establish the connection. A status message is output if retries are unsuccessful for too long.

If a successful connection is established, a small number of files are put on the machine, one of which is a bootstrap install service registered in the client machine's registry as a service. A service manager runs the install program, essentially starting a bootstrap process that operates to access the registry and connect the client machine to a client access point (CAP) server that is identified to the client and stored in its registry. The bootstrap service then installs the remainder of the management software on the client machine from the CAP.

Because such installations can fail, the CCR for a started installation is marked as started and added to the retry queue. When the Client Configuration Manager service later dequeues that CCR, it checks to see if installation was successful. If so, the CCR is removed from the queue, but if not, the CCR is used to reattempt the installation.

In one enhanced implementation described herein, to avoid some of the security and scalability problems, when the logged on user has sufficient security permissions, a CCR is not generated by the client machine. Instead, if a logged-on user has sufficient rights, a client logon process performs the install. As a result, for such users, the server need not initiate a connection to the client, nor does a security account with administrator privileges need to be set up on the server. The security and scalability (e.g., bottleneck) problems related to server-initiated installations are thus avoided for users having sufficient security permissions.

Other advantages will become apparent from the following detailed description when taken in conjunction with the drawings, in which:

DETAILED DESCRIPTION OF THE PREFERRED EMBODIMENT

Exemplary Operating Environment

Figure 1:
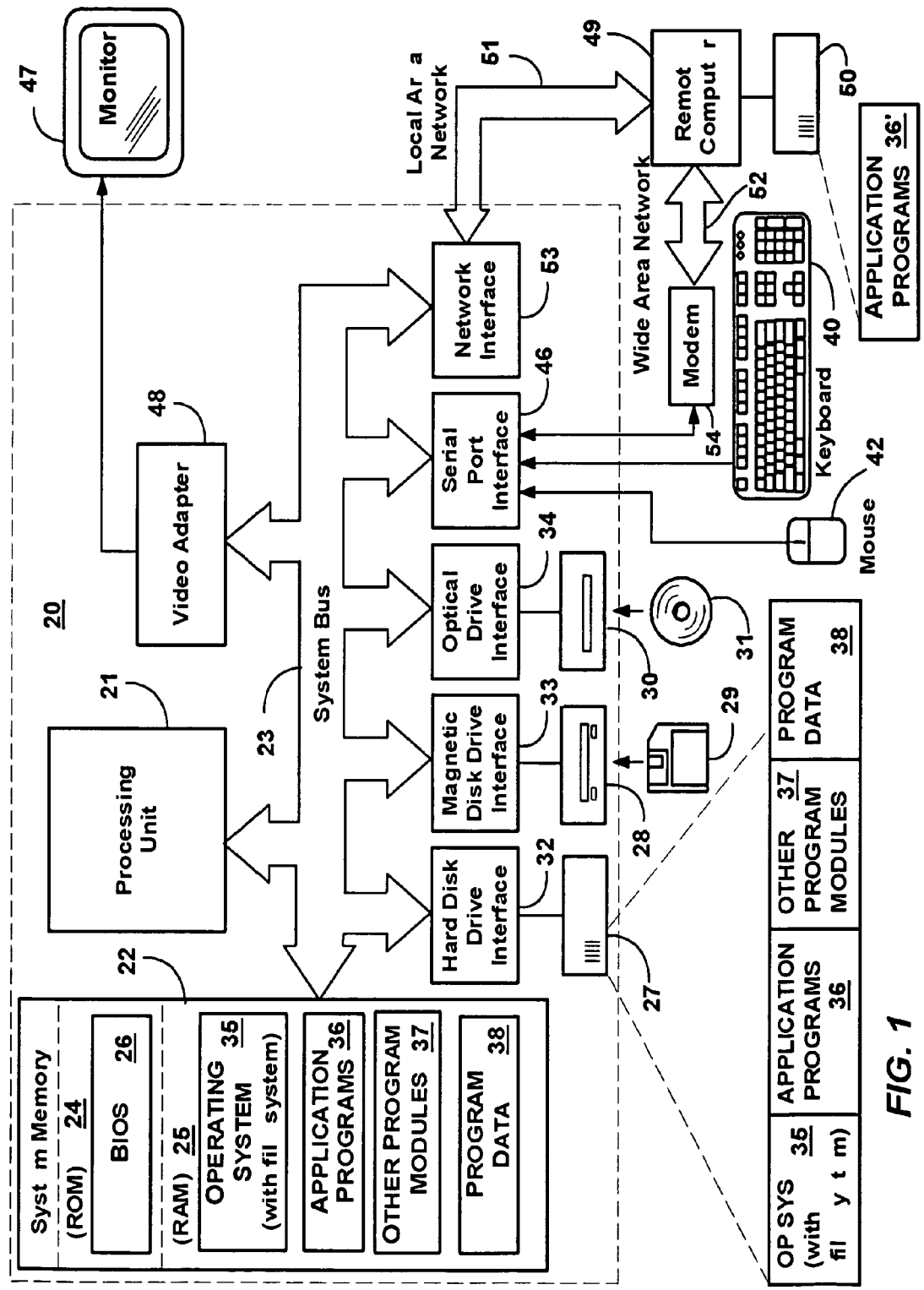
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a node (i.e., system) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. For purposes of the following description, the computer system 20 may comprise the client system to which management software is installed, while the remote computers 49 may comprise network servers, such as site servers, domain controllers (logon points), and client access points, described below. Note that a site, which typically (but not necessarily) corresponds to a physical location or some logical grouping of computers, comprises one or more ranges of IP addresses of which computers can be members.

Client Discovery and Installation

Figure 2:
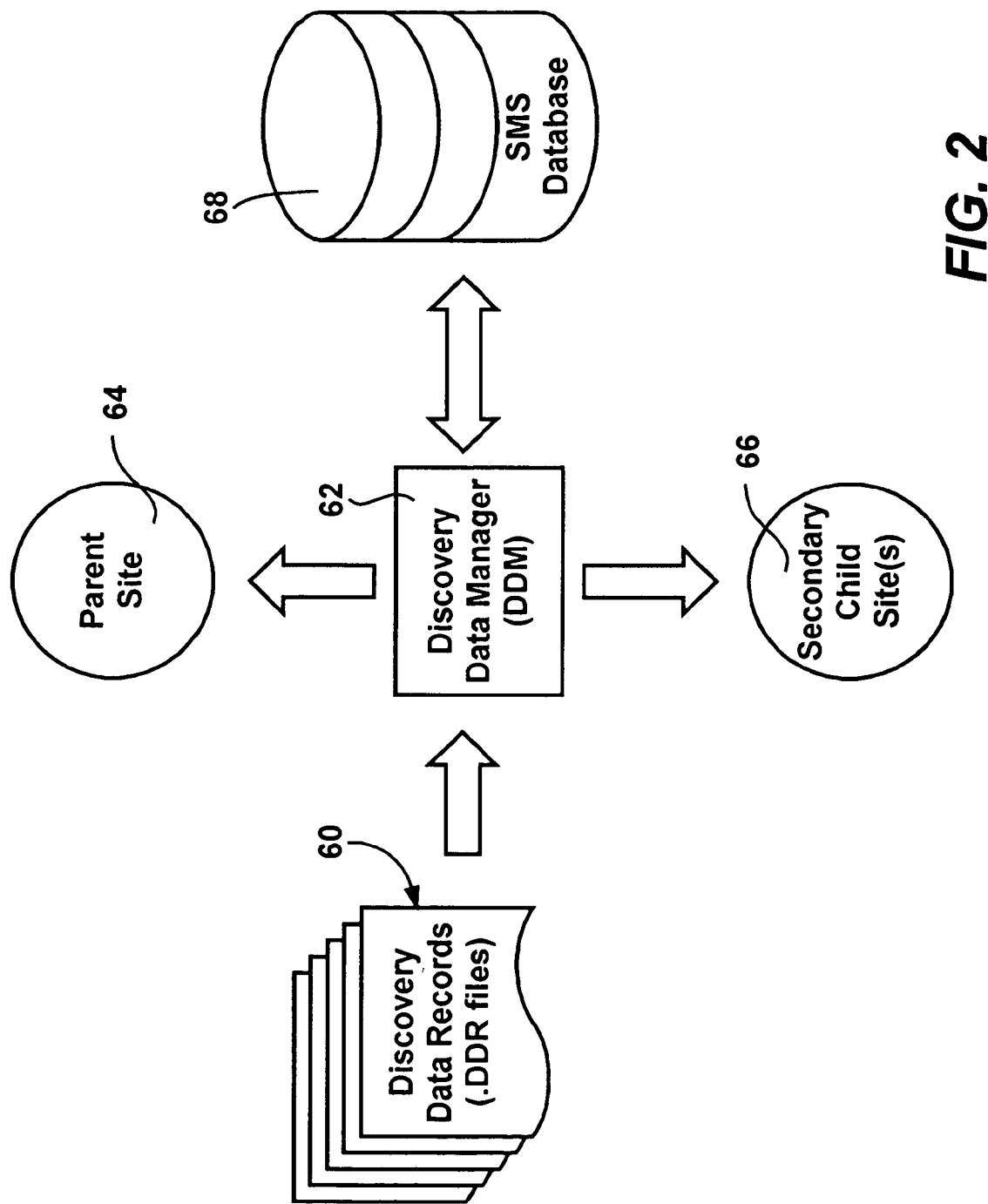
FIG. 2 is a block diagram generally representing discovery of network resources.
Figure 3:
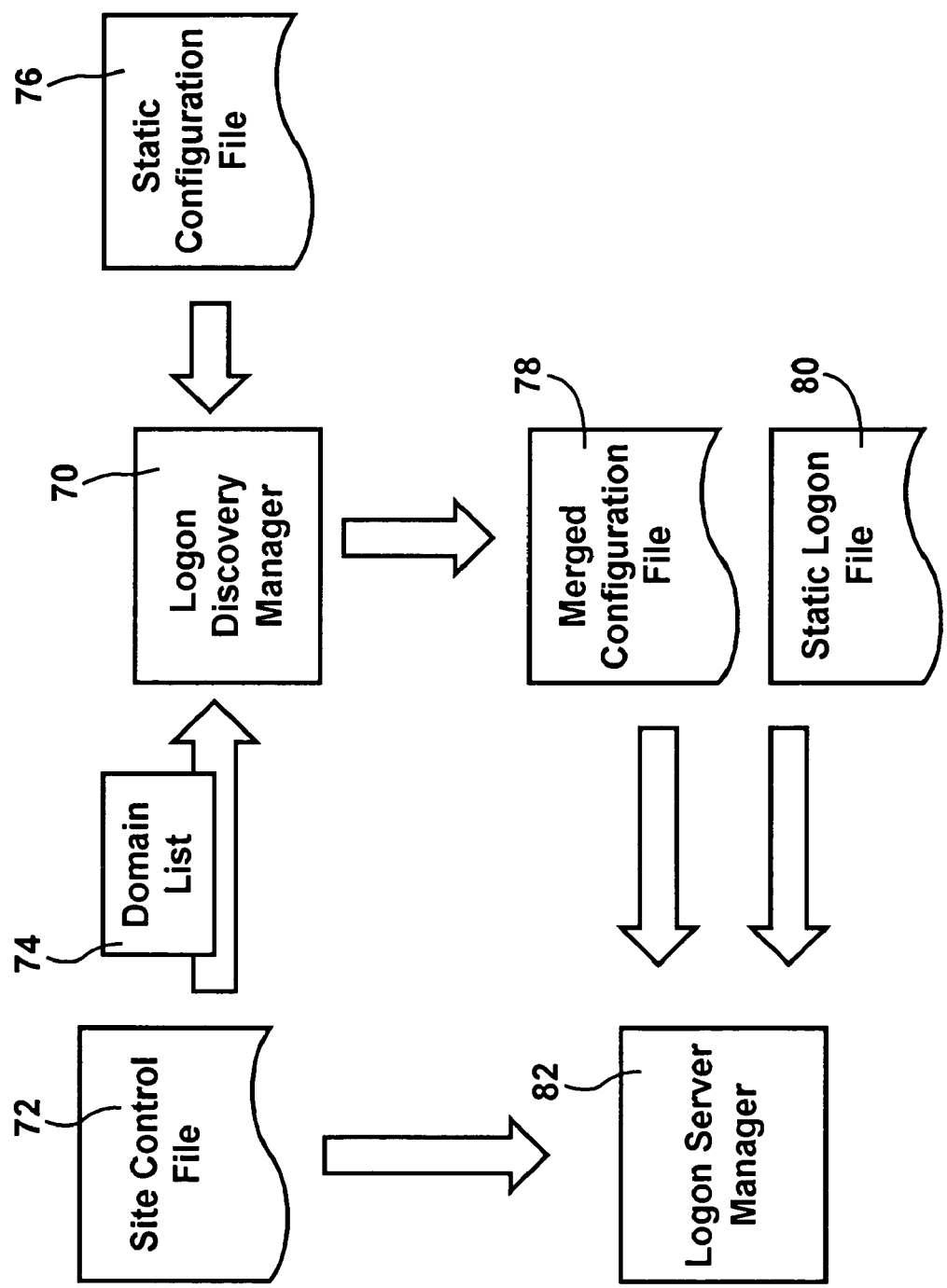
FIGS. 3 and 4 are block diagrams generally representing components and network resources for the preparation of a network for network discovery.
Figure 4:
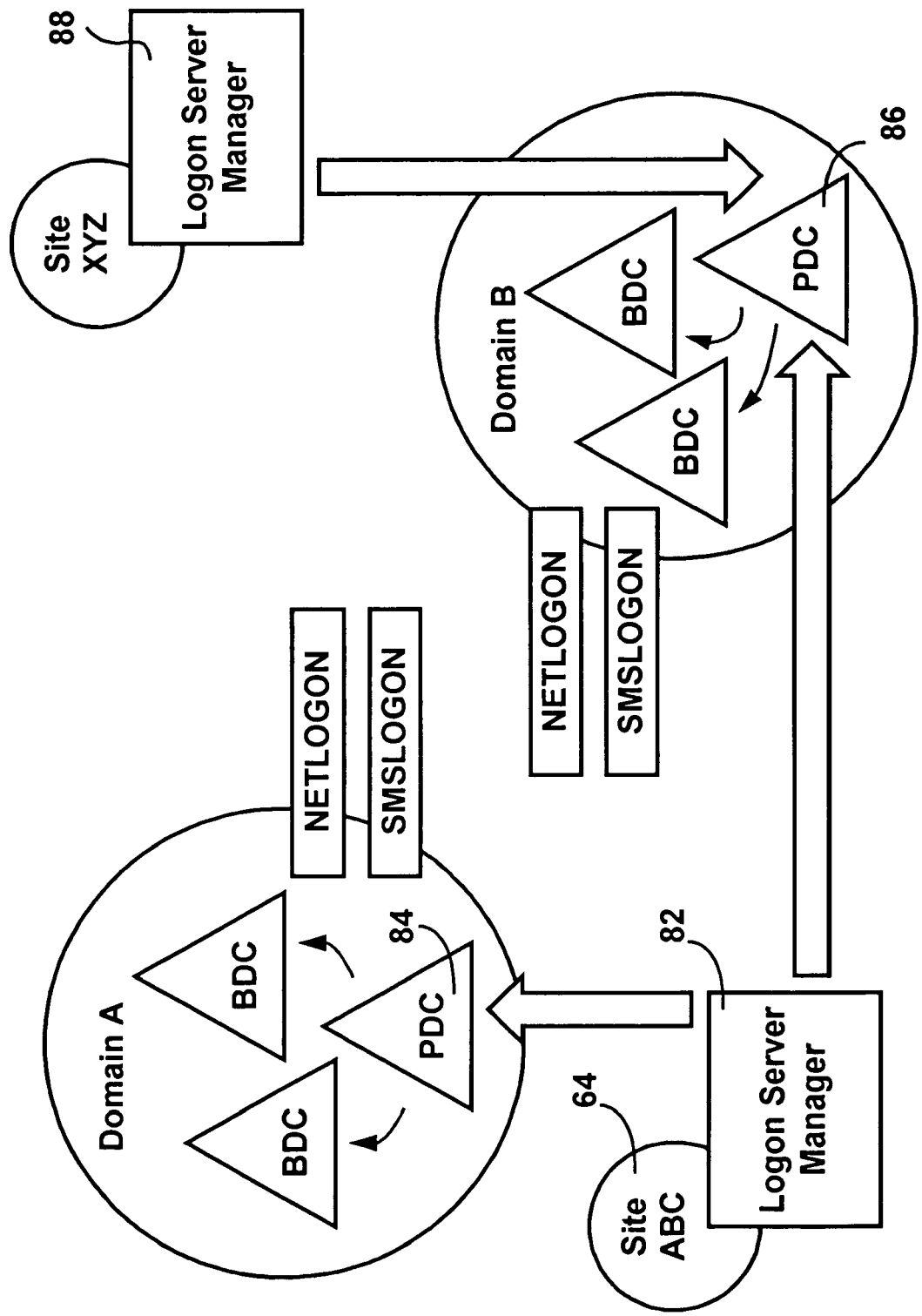

FIGS. 2–4 provide a general representation of the architecture and related concepts underlying client installation, including remote client installation in accordance with various aspects of the present invention, while FIGS. 15–25 provide logically interconnected flow diagrams generally describing how the architecture is utilized for client installation. Beginning at FIG. 2, there is shown a number of discovery data records (DDRs) 60, which represent resources found on a network via various network resource discovery techniques. Many such network resource discovery techniques are known, and thus are not described in detail herein, except to note that machines connected to a network may be found via network resource discovery, and the information about those machines may be stored in the DDRs 60 or some other format. For example, DHCP servers may be polled as part of network discovery to find out about the machines of which the DHCP servers are aware, and similarly, a domain controller, (a domain can span multiple physical locations or sites), which has knowledge of machines registered therewith, may be polled. Network resource discovery uses these and other sources to try to figure out which machines are present in a network, possibly attempt to contact the machines (e.g., via SNMP) for more information, and, in at least one implementation, produces DDRs representing those machines.

As shown in FIG. 2, a discovery data manager 62 associated with a parent (primary) site 64 and/or one or more child (secondary) sites 66, receives the DDRs as they are being discovered. The discovery data manager 62 places these in a Systems Management Server (SMS) database 68 that is associated with the parent site 64. If the database 68 already has a record for the same machine, the discovery data manager 62 merges the data (which may be different, depending on how discovered) therein and preserves the relevant information. Note that secondary sites 66 do not include an SMS database, and use the primary site to provide some of the data discovery manager processing, but for purposes of the present invention may be considered conceptually similar to primary sites.

FIG. 3 provides a representation of components underlying an alternative type of discovery, client logon discovery, that may produce DDRs during execution of a client logon script. A logon discovery manager 70 obtains dynamic configuration data via a site control file 72 including a list 74 identifying which domains have been configured to perform logon discovery. From that list 74, along with some static data from a static configuration file 76, the logon discovery manager 70 produces a merged configuration file 78, which is fed along with data from a static logon file 80 and the site control file 74 into a logon server manager 82.

FIG. 4 represents how the logon server manager 82, running on a site (server) ABC, configures primary domain controllers 84 and 86 of Domain A and Domain B, respectively, to prepare the controllers 84 and 86 to run logon discovery. Note that domains also include backup domain controllers, labeled "BDC" in FIG. 4, that replicate primary domain controller information. Preparing the domain controllers 84 and 86 for logon discovery includes copying a logon script file, associated executables and other binaries to the domain controllers 84 and 86. As also shown in FIG. 4, another site (server) XYZ has another logon server manager 88 which coordinates with the logon server 82 to also prepare the primary domain controller 86 of Domain B for logon discovery. Note that a logon server manager (e.g., 82) of a site (e.g., 64) may prepare one or more domains. Once a domain controller has been configured for logon discovery, the domain controller is generally referred to herein as a logon point.

Figure 5:
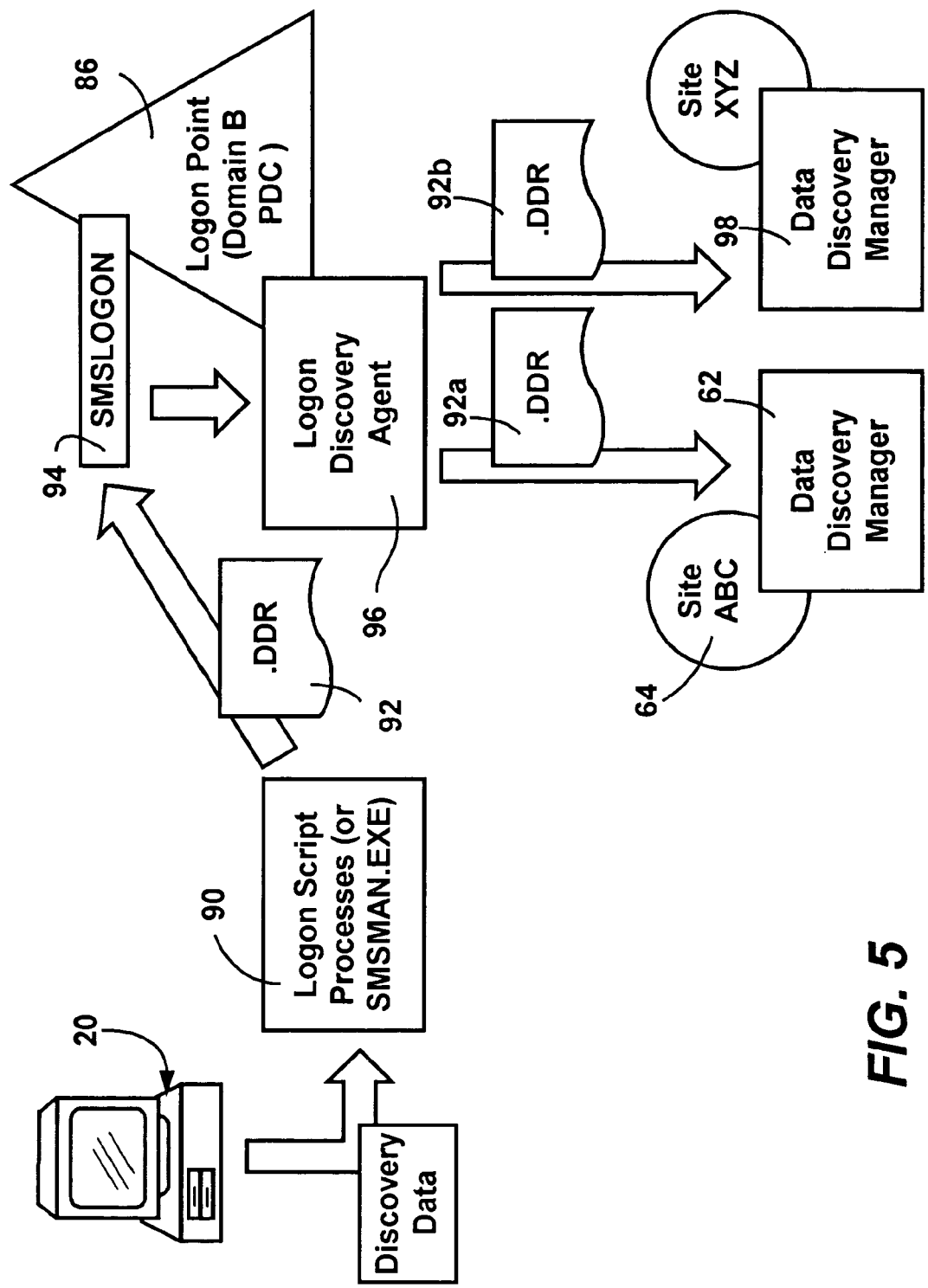
FIG. 5 is a block diagram generally representing one type of network discovery, logon discovery, from a client machine perspective.

FIG. 5 represents the logon discovery from the perspective of a client machine, such as the computer system 20, wherein the machine 20 provides discovery data (e.g., machine name and IP address) to a logon script (or manually executed file SMSMAN.EXE) 90 that gathers the discovery data and produces a DDR 92 therefrom. The DDR 92 is copied to an SMS logon service 94 on the logon point (domain controller) 86. The logon point 86 includes a service known as a logon discovery agent 96, which copies the DDR 92 to each site server that is interested in discovery, e.g., site servers ABC and XYZ both want discovery from this particular Domain B, and thus each get a copy 92a and 92b sent to their respective data discovery manager 62 and 98. As previously described with reference to FIG. 2, the data discovery manager 62 then merges the DDR 92a with information in the SMS database 68. Although not shown, it is understood that the data discovery manager 98 of site XYZ will merge its copy of the DDR 92b with a like database (not shown).

Figure 6:
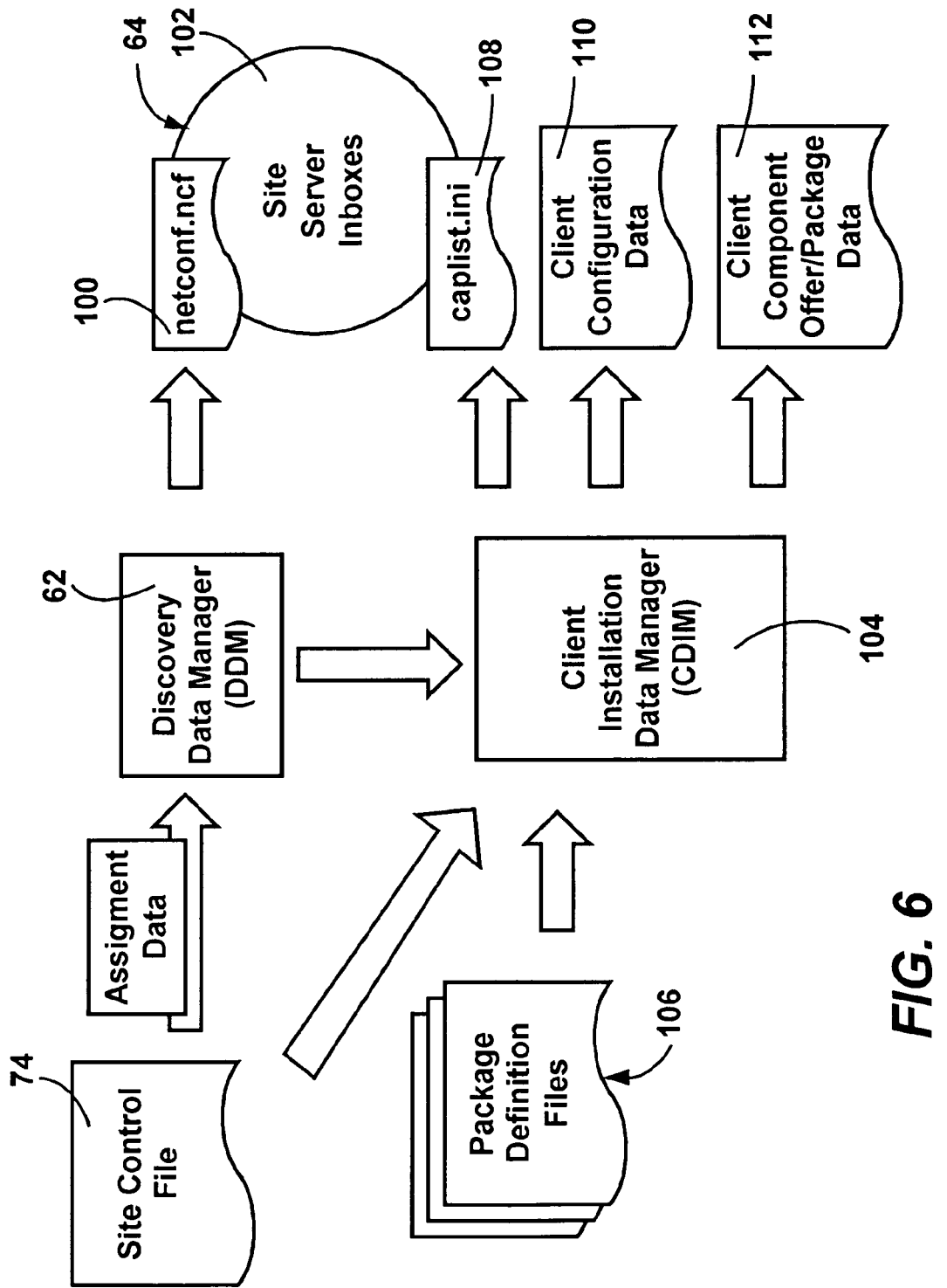
FIGS. 6–8 block diagrams generally representing components underlying a client installation infrastructure.
Figure 7:
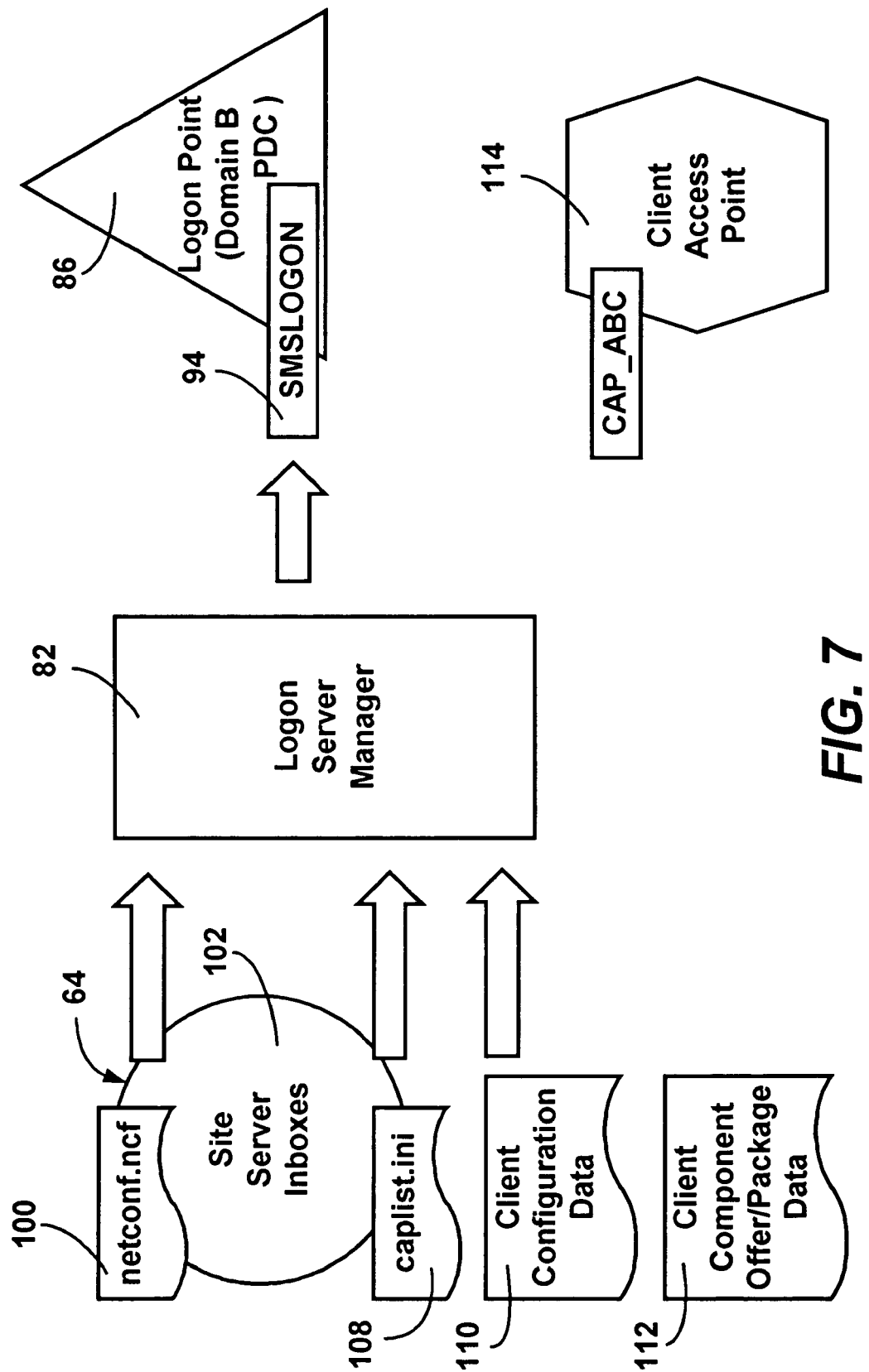
Figure 8:
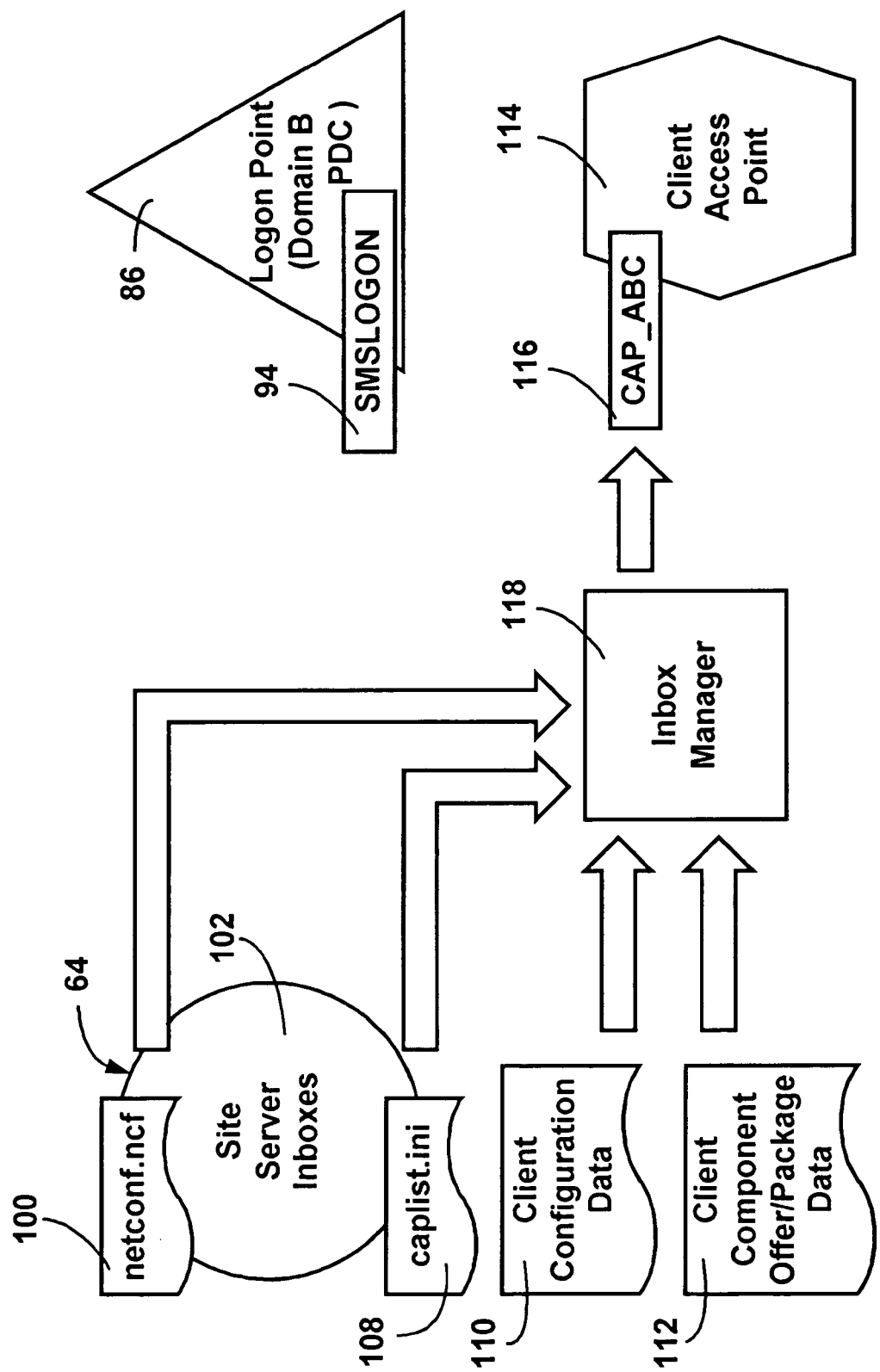

The architecture underlying client installation is described beginning with FIG. 6, wherein in FIGS. 6–8, the preparation of a site for receiving clients and responding to client installation needs is generally described. First, a process of the data discovery manager 62 decides which individual machines will become clients of a particular site, via assignment criteria, i.e., if a client has an IP address within an IP subnet listed for the site, then the client is part of that site. The data discovery manager 62 accesses the site control file 74 for the assignment criteria, and stores appropriate network configuration information in a file 100 in a site server inbox 102 of the site server 64. A second process shown in FIG. 6 is performed by a client installation data manager 104, which reads package definition files 106 in order to enable the binaries needed for client installation to get to appropriate servers (client access points, FIGS. 7 and 8 described below) for those clients. The client installation data manager 104, writes a client configuration file 108 and other files 110 and 112 for this purpose.

FIG. 7 shows three of the data files (100, 108 and 110) being copied from the site server inbox by the logon server manager 82 to the logon point 86 (via the SMS logon service 94) for installation. As described in more detail below, for installation, only the core bootstrapping files needed for initiating the client installation are copied to the logon point. A primary goal is to keep this part of the installation as fast and small as possible, since this part of the installation needs to be done by a machine having administrator rights, and any network communication with such machines should be kept small because for security reasons, only a small, physically secured number of administrative-level machines should be in a network.

As a secondary part of a client installation, a client access point (e.g., 114) provides the bulk of the installation data, as described below. Client access points are servers designated by the administrator via which clients may download relatively large amounts of data, including the larger portions of the client installation data, thereby removing the majority of the installation workload from the site servers/logon points. To further distribute workload, a client may be given a list of several client access points from which to download data, one of which the client selects (possibly randomly). As shown in FIG. 8, the configuration and installation data in the files 100, 108 and 110, and the file 112 (including the large client component package data) is copied from the site server to a service 116 of the client access point 114 via an inbox manager 118.

Figure 9:
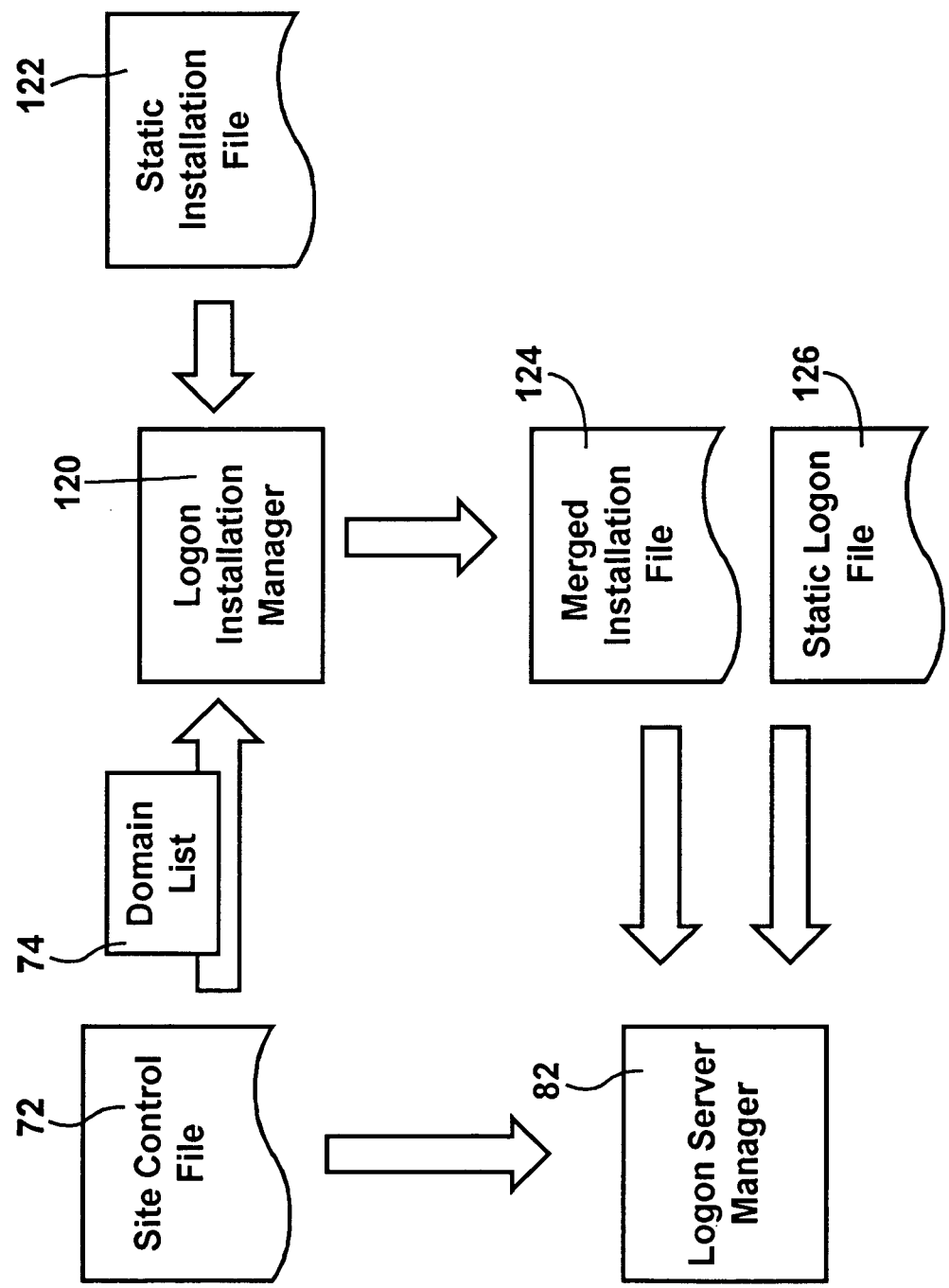
FIG. 9 is a block diagram generally representing one type of client installation, logon installation.

FIG. 9 is an installation process that is essentially identical to the discovery process described above with reference to FIG. 3. Thus, the site control file 72 is accessed to provide the list 74 identifying which domains have been configured to perform logon installation to a logon installation manager 120. From that list 74, along with static installation data 122, the logon discovery manager 70 produces a merged installation file 124, which is fed along with data from a static logon file 126 and the site control file 74 into the site's logon server manager 82.

Figure 10:
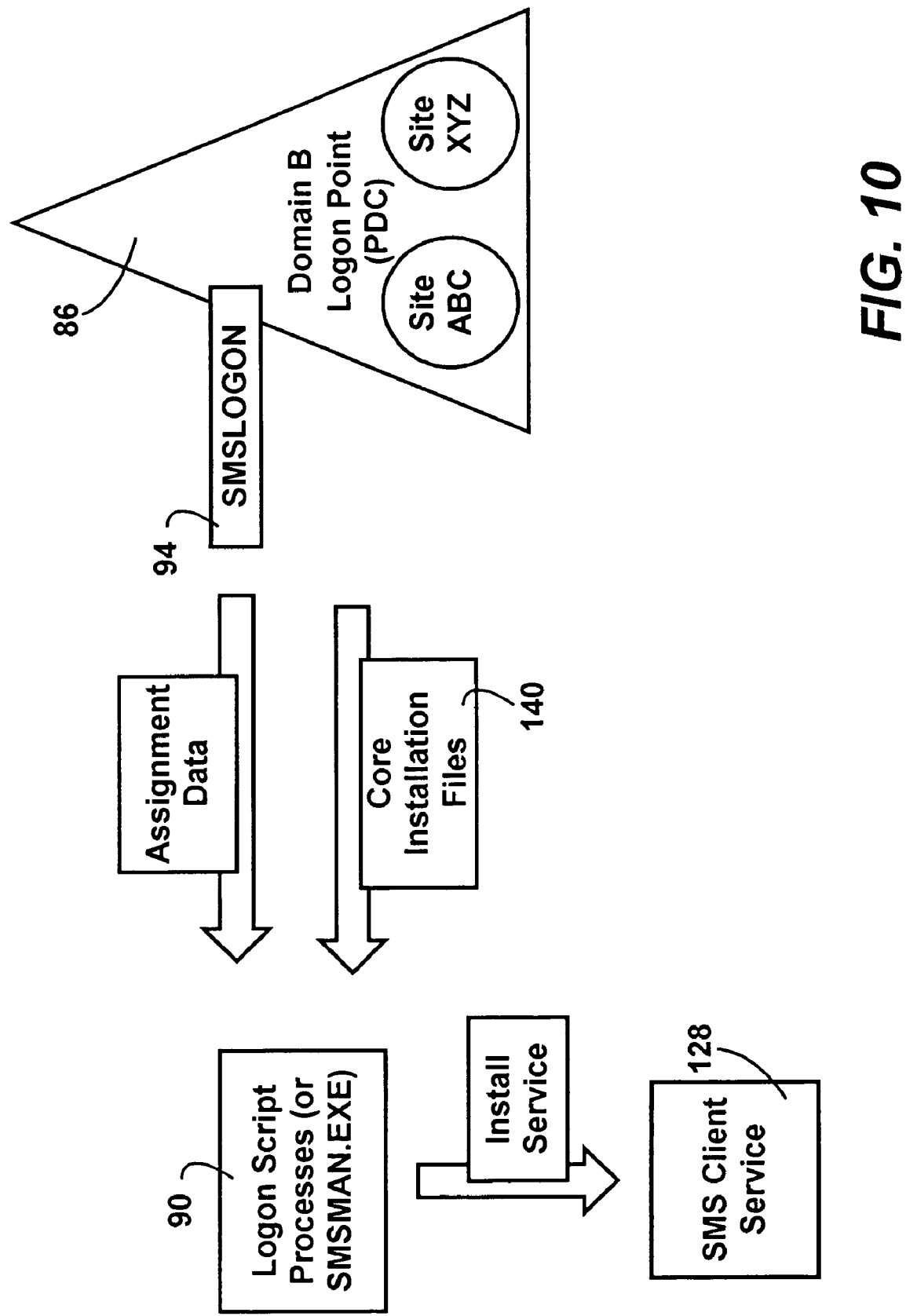
FIG. 10 is a block diagram generally representing client installation on a machine having administrator rights.

At this time, the various network servers are readied for client installations. One possibility is that the client has administrator (or other sufficient security) rights, in which event the client is able to directly obtain the SMS client service 128. More particularly, as represented in FIG. 10, the client gets assignment data and core installation files from the logon point 86, and then, via the administrator-level client's logon script (or SMSMAN.EXE) 90, an install service of the client directly installs the SMS client service 128 and other core components (FIG. 13) from the CAP. Details of the installation are described below with reference to the flow diagrams of FIGS. 14–25.

Figure 11:
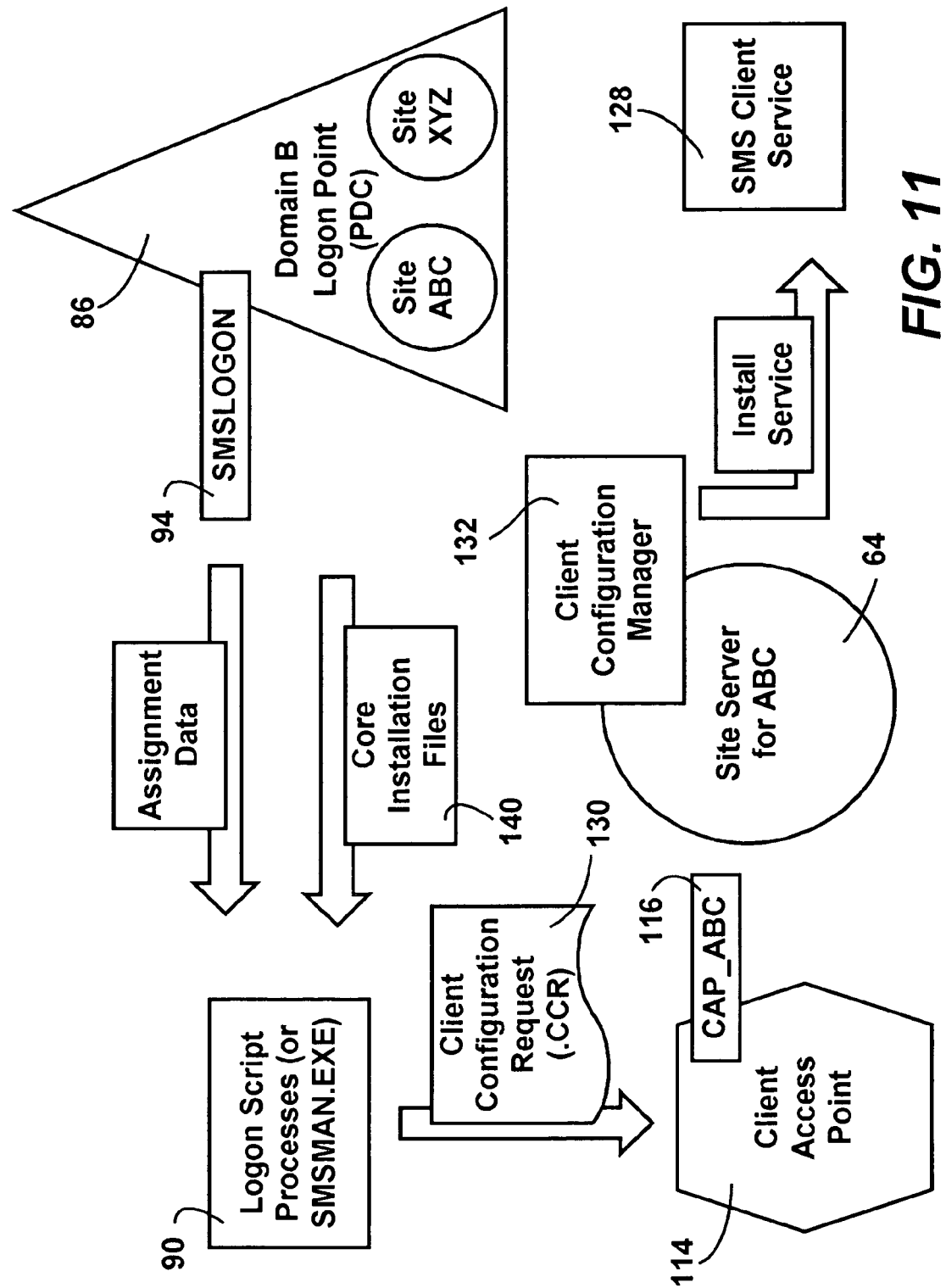
FIG. 11 is a block diagram generally representing client installation on a machine that does not have administrator rights.

In accordance with one aspect of the present invention and as generally represented in FIG. 11, clients that do not have the rights needed for directly installing the SMS client service are instead able to install the service via a client configuration request (CCR) 130. To this end, the client logon script (or SMSMAN.EXE) 90 receives the assignment data and core installation files from the logon point 86, but realizes that the client does not have the rights needed to complete the installation and instead generates the CCR 130 (which essentially identifies the machine) and provides it to the client access point 114. When the CCR gets copied to the site server, a client configuration manager 132 at the site server (e.g., the ABC site server 64) obtains (e.g., dequeues) the request, connects to the client machine as needed to install a bootstrapping mechanism (the client configuration manager 132 has the security rights needed to perform this initial installation). The bootstrapping mechanism can then install the SMS client service 128 thereon. The client service 132 manages the infrastructure of the client computer, e.g., via the service 132, the client regularly contacts the client access point 114 and maintains the client machine (e.g., installs, removes or updates components) in accordance with administrator instructions at the client access point 114.

Remote Client Installation

Figure 12:
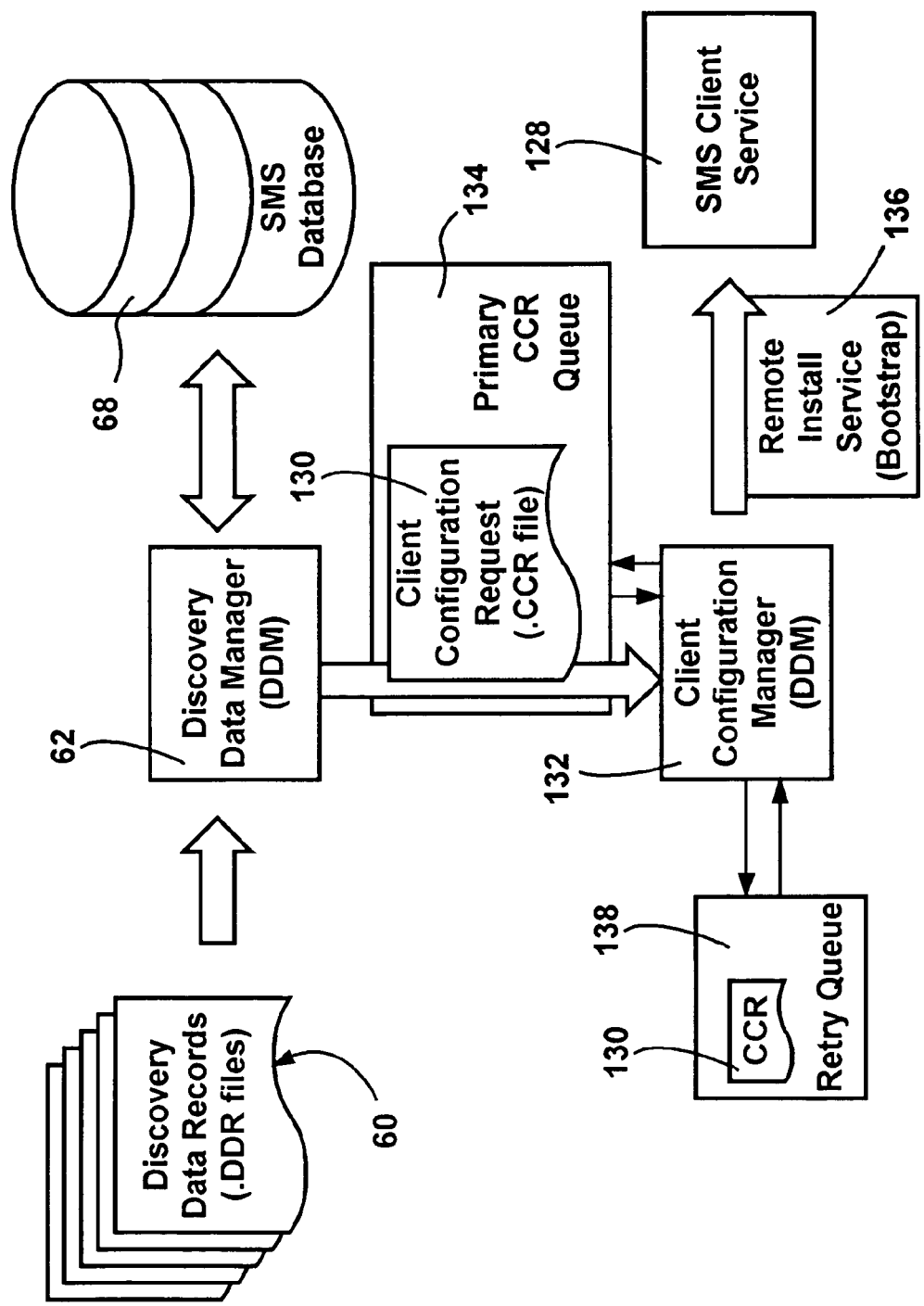
FIG. 12 is a block diagram generally representing remote client installation in accordance with an aspect of the present invention.

In accordance with another aspect of the present invention and as generally represented in FIG. 12, machines can be remotely installed as clients without user intervention, i.e., without logging on or running a manual installation program. To this end, as represented in FIG. 12, the data discovery manager 62 examines DDRs 60 as they are discovered to determine which ones correspond to discovered machines that fit the criteria for being clients, i.e., which should be clients, and can be made clients. For example, such machines should not already be known to be clients, need to fit within the boundary of a subnet of the site, have the appropriate operating system (e.g., Windows® 2000) for the machine to be a client, and so forth, (as further described below with reference to FIG. 15).

If the machine identified in a DDR is an appropriate candidate to be a client, the discovery data manager 62 creates a CCR 130 (like the one the client can create during logon) on its behalf, and places it into a CCR queue 134 or the like. From there, the client configuration manager 132 takes the CCR 130, and, if the client configuration manager 132 can connect to the machine and the machine can be made a client, the client configuration manager 132 at the site installs a remote bootstrap service 136 (e.g., comprising two executable files described below) on the client machine. The client configuration manager 132 also provides client access point information (into the "client" machine's registry) and, by registering the bootstrap service in the client registry as a service, causes a service manager (NTService) to start the remote bootstrap service 136.

The remote bootstrap service 136 contacts the client access point (e.g., 114) to install the client service 128 on the machine, whereby the machine essentially becomes a client. Also, as described below, the client configuration manager 132 may mark the CCR 130 to indicate "bootstrap started" and place it into a secondary retry queue 138, where it will later dequeue the CCR to ensure that the remote bootstrap service 136 has acted successfully, and if not, attempt to cause the install again. The client configuration manager 132 also may put the CCR 130 into the retry queue 138 if it is unable to connect to the machine and install the remote bootstrap service 136 thereon.

Figure 13:
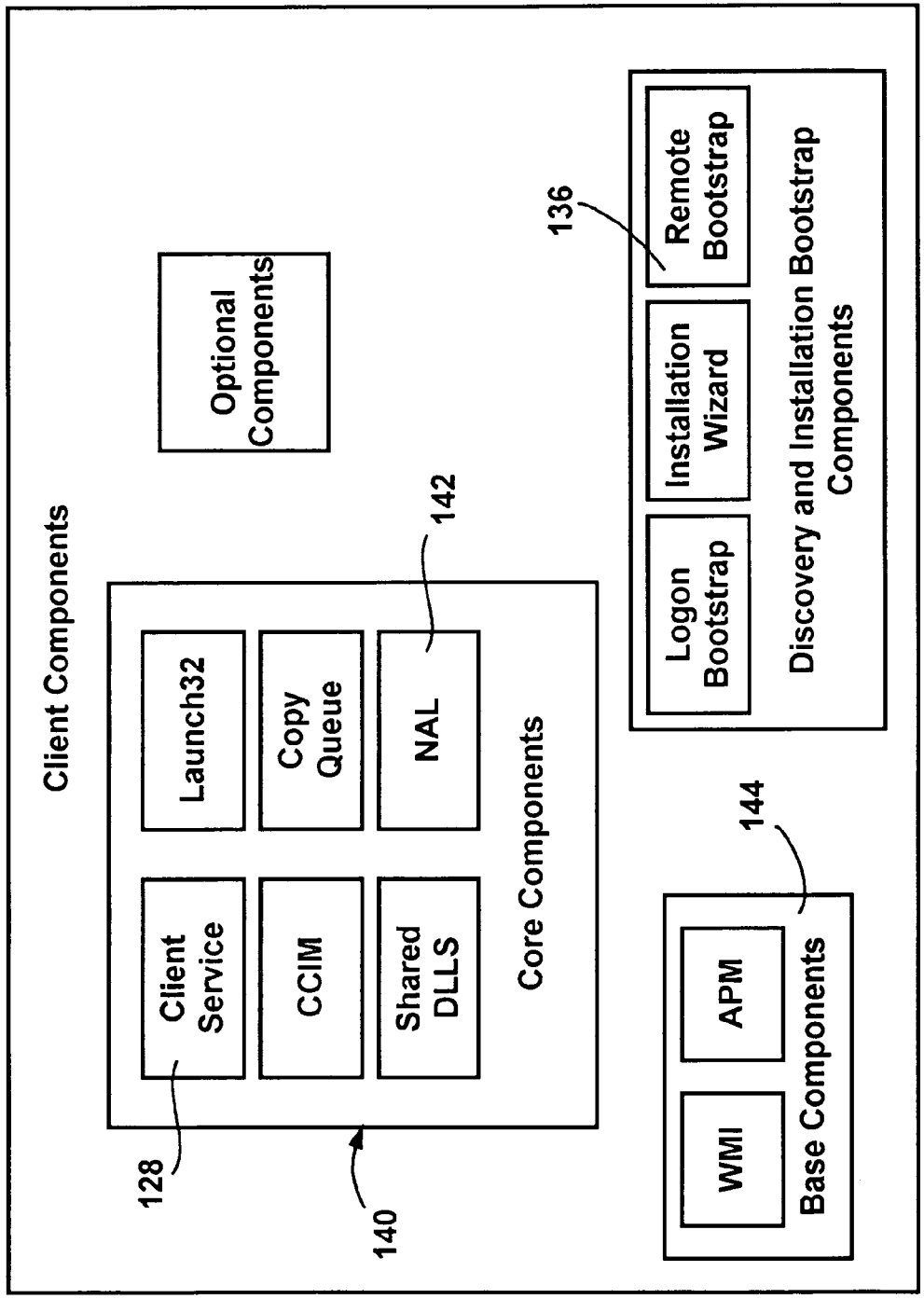
FIG. 13 is a block diagram generally representing various client components installed via remote client installation in accordance with an aspect of the present invention.

FIG. 13 shows a number of client components, including the remote bootstrap service 136 and core components 140 such as the client service 128. These and other components shown in FIG. 13 are further described below with reference to the flow diagrams of FIGS. 14–25.

Figure 14:
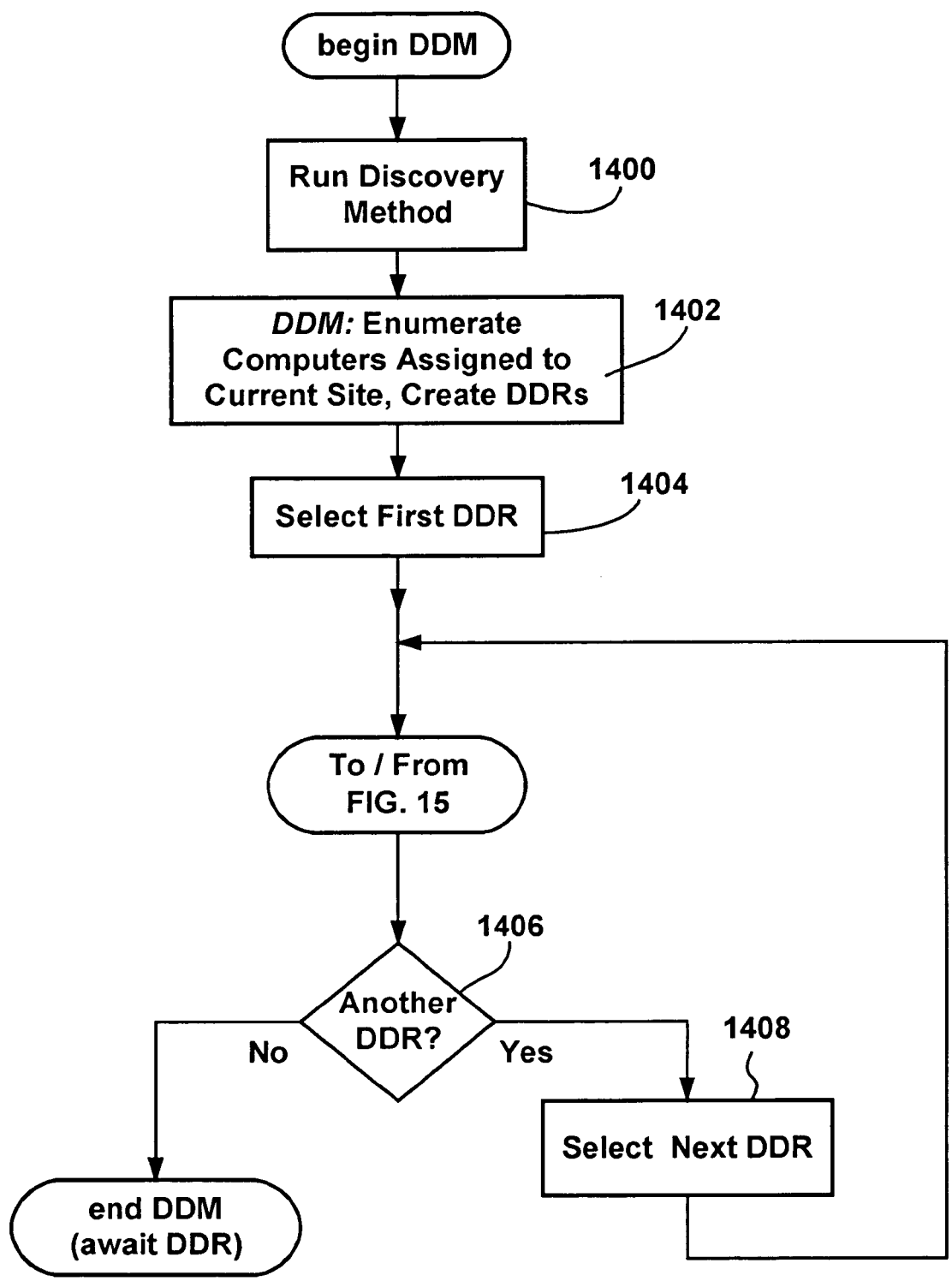
FIGS. 14 and 15 comprise a flow diagram generally representing a general process for creating client configuration requests for machines discovered by network discovery, in accordance with an aspect of the present invention.
Figure 15:
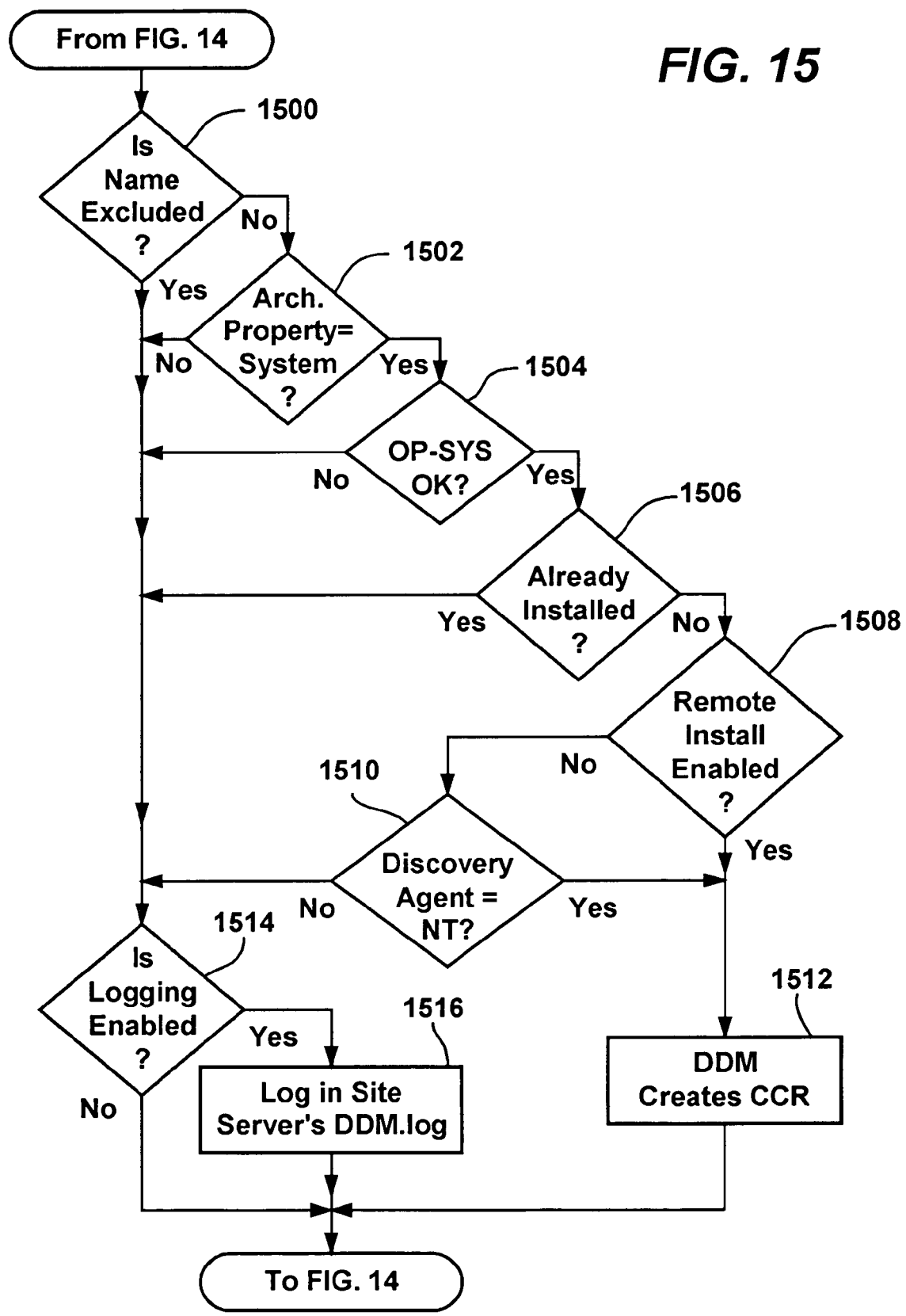

Turning to the flow diagrams, FIG. 14 shows general steps essentially performed by the data discovery manager 62, although step 1400 is not ordinarily performed by the data discovery manager 62, but rather represents the running (e.g., by an administrator) or one or more discovery methods that generate the data discovery records 60 and other information for discovered network resources. From the information, at step 1402, a process of the data discovery manager 62 (the DDM process) enumerates those computers assigned to the current site that have an appropriate operating system (e.g., Windows® NT or Windows® 2000), and creates a DDR for each such computer (fi one does not already exist). Via steps 1404–1408, the DDM process selects each numerated DDR and determines whether to create a CCR therefor, as generally represented in FIG. 15.

As generally described above, a machine having a DDR is generally tested for meeting certain criteria before the machine can become a candidate for remote client installation. Steps 1500–1508 represent the testing for that criteria by the DCM process, although as will be understood, the tests may be performed in a different order, and additional tests or a lesser amount of tests may be performed. Moreover, the tests need not be necessarily performed, e.g., some are for efficiency and are thus beneficial, but not required. In any event, step 1500 tests whether the machine name in the DDR is on a list of excluded machines (e.g., servers), which an administrator decides so that inappropriate machines (e.g., certain servers) are not made clients. The list of excluded servers is stored in the site server registry key HKEY_LOCAL_MACHINE\SMS\Components\SMS_Discovery_Data_Manager\Exclude Servers. If excluded, the process branches ahead to step 1514, wherein if logging is enabled, information about the attempt is logged at step 1516. If logging is not enabled, or after logging is performed at step 1516, the DDM process returns to the steps in FIG. 14 to select and process the next DDR, or if none remain for processing, end the process, (e.g., sleep until a DDR is available). If the machine is not excluded at step 1500, step 1502 is executed to perform the next test.

Step 1502 tests whether the resource architecture is set to "System," (as opposed to IP Network, User or User Group). If so, the next test is performed, otherwise this DDR is not considered a candidate and as described above, the next DDR, if any, is selected (step 1408) after possibly logging the attempt (step 1516).

The next test at step 1504 evaluates the operating system for appropriateness, which in one preferred implementation requires that the operating system be Windows® 2000 or Windows® NT. Also, if the operating system is not known from the DDR, the attempt may be made may be made anyway to see if the machine can become a client, in which event the DDM process performs the next test on the DDR by branching ahead to step 1506. Otherwise, the test fails, and the DDM process branches to step 1514 as described above.

Step 1506 tests whether the SMS database 68 indicates that the client service 128 has already been installed on the computer system. If so, the DDM process rejects this DDR as a candidate for remote installation, by branching to step 1514 as described above. If not, another test is performed at step 1508 to determine whether remote client installation is enabled, i.e., in an SMS administrator console. If not, the DDR is further evaluated at step 1501 to determine whether the discovery agent that created the DDR was "Windows NT Server Discovery," in which event the remote installation attempt should still be made for this machine. If the DDR evaluation for either remote install enable (step 1508) or the discovery agent (step 1510) is passed by the selected DDR, the DDM process continues to step 1512 where a CCR is created based on the currently selected DDR, and placed in the primary CCR queue (\\SMS\Inboxes\Ccr.box). The DDM process then returns to FIG. 14 to similarly process any other DDRs.

Figure 16:
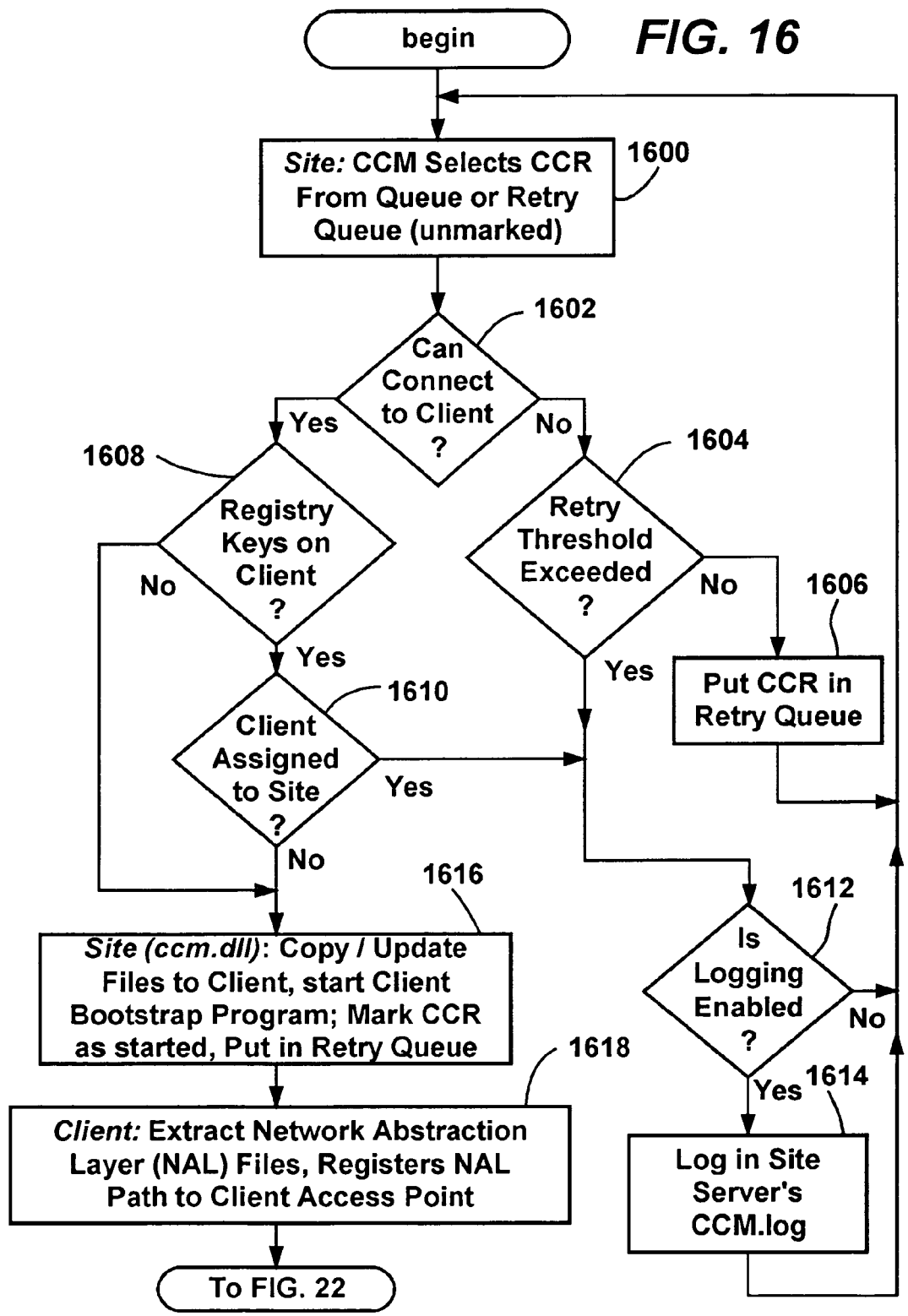
FIG. 16 is a flow diagram generally representing the handling of client configuration requests to accomplish remote client installation in accordance with an aspect of the present invention.
Figure 17:
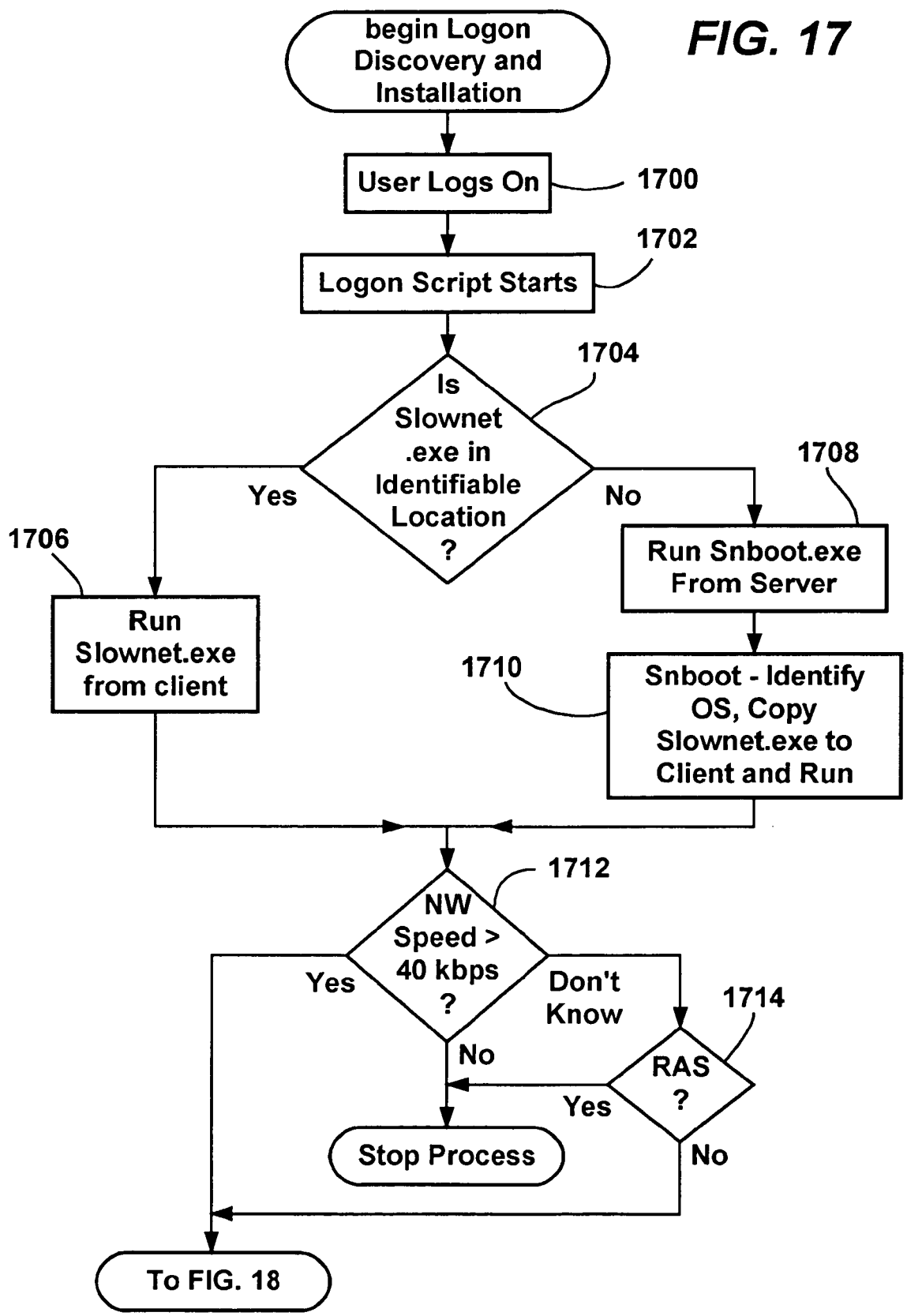
FIGS. 17–21 comprise a flow diagram generally representing logon installation.
Figure 18:
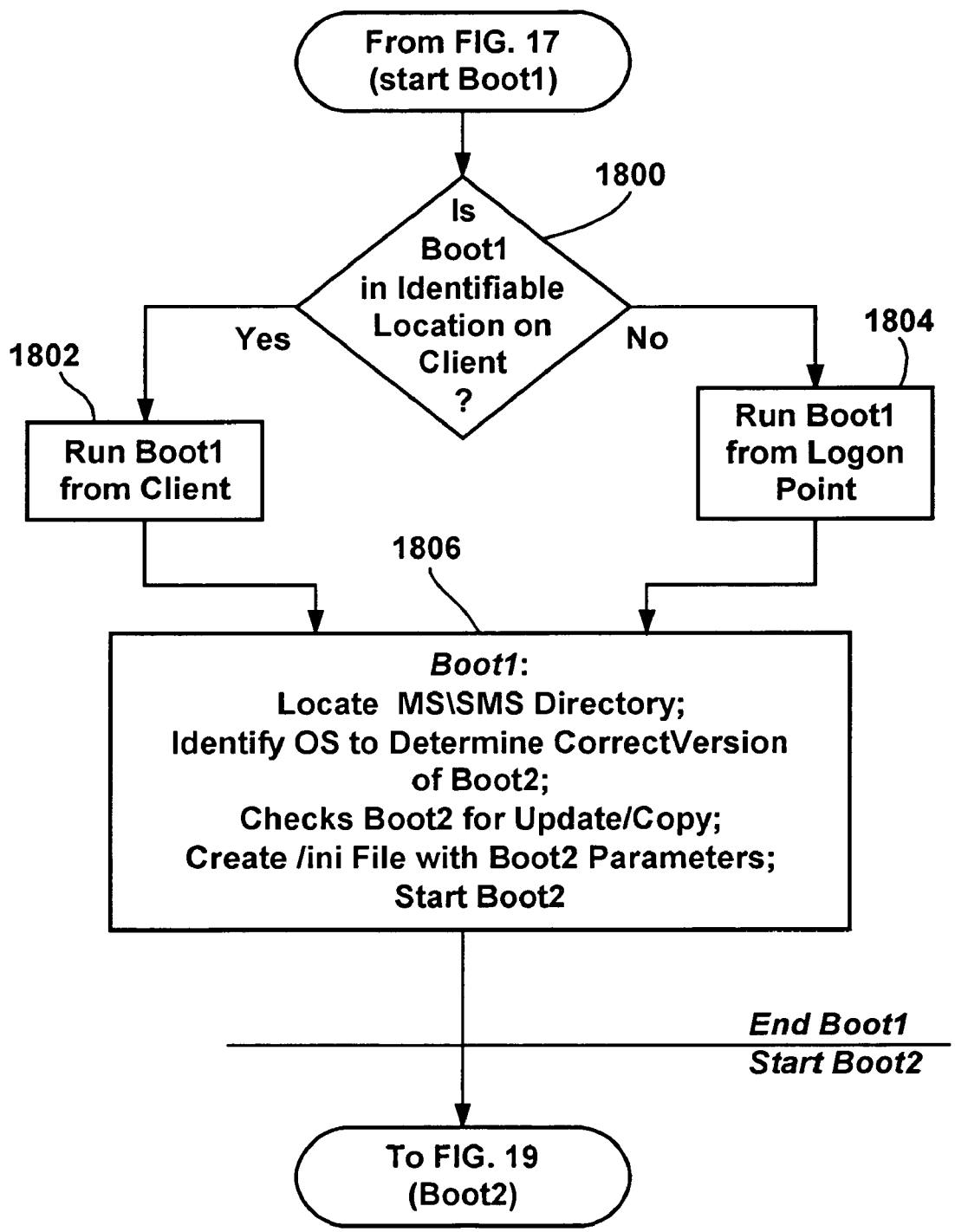

FIG. 16 generally represents a process of the client configuration manager 132 (CCM process), beginning at step 1600 wherein the CCM selects a CCR from the CCR queue 134 or the CCR retry queue 138. Note that if the CCR is marked as being one representing an already started bootstrap, the bootstrap is checked, and if successful, the CCR is discarded and another one is selected, and if the bootstrap is not successful, the mark is effectively removed from the CCR and the CCM process restarted therefor. Steps 1602–1616 relate to CCRs that have not been marked or have had the mark removed therefrom. Also, note that the CCM process may only process CCRs from the retry queue 138 after some interval (e.g., once per hour), and may dynamically adjust (a configurable) number of threads used thereby depending on the size of the queues 134, 138.

Step 1602 tests whether the CCM process can connect to the client computer. If not, step 1602 branches to step 1604 where the CCR is evaluated against a retry threshold, e.g., in one implementation, the CCM will retry CCR processing for up to seven days, the retry threshold. If the threshold has not been exceeded, the CCR is placed into the retry queue 138 for a later attempt, which may be delayed for some time interval (e.g., such that the retry queue is processed once per hour) so as to not continuously retry this CCR. If the retry threshold has been exceeded, this CCR is essentially rejected, and the CCR can log the thresholding failure attempt if enabled to do so (steps 1612 and 1614). Note that a message may be sent to an administrator at any point wherein installation fails, such as when the CCM process cannot connect to the client computer. This message may be disabled for a period of time (e.g., the first twenty-four hours), to give remote installation several chances before notifying an administrator. Further, note that the various types of failures may have different messages sent and/or information logged therefor, and that the type of failure (e.g., no communication versus a security problem) may be a factor in setting the retry threshold, retry interval and/or the initial delay time before sending a message.

Returning to step 1602, if a connection with the client is established, step 1608 is executed, which checks for the presence of certain registry keys on the client (HKEY_LOCAL_MACHINE\SOFTWARE\Microsoft\SMS Client\Configuration\Client Application Launchers\Client Configuration Installation Manager\Heartbeat and HKEY_LOCAL_MACHINE\SOFTWARE\Microsoft\SMS Sites\Site List) which indicate that the client has already been installed. If the registry keys are already on the client, and the client is assigned to the site (step 1610), then the CCM process rejects this CCR by branching to step 1612 as described above, wherein if logging is enabled, a message essentially indicating this already installed state will be logged therefor at step 1614. If the keys are not on the machine, or are present but the client is not assigned to this site, then step 1616 is executed to begin the installation.

At step 1616, a component (e.g., ccm.dll) of the CCM process of the site server copies and updates the bootstrap service 136 to the client computer, comprising two files, Ccmcore.exe and Ccmbtldr.exe.

Step 1618 is performed by the client machine's bootstrap service (i.e., ccmbtldr, and not the site's CCM process), which (by calling Ccmore.exe) extracts network abstraction layer (NAL) Files 142 (FIG. 13), and registers a NAL path to the client access point 114. The client bootstrap process continues thereafter at step 2210 of FIG. 22 as described below.

FIGS. 17–25 provide a general description of the logon discovery and installation process. Note that part of this installation process is common to the remote client installation (no logon necessary) process of the present invention, as described beginning at step 2210 of FIG. 22. Logon discovery and installation aspects will only be generally described herein for informational purposes. Step 1700 of FIG. 7 represents a user logon, at which time the logon script starts (step 1702). If a program (Slownet.exe) used for logon is located on the client, step 1704 causes it to be locally run it at step 1706, otherwise steps 1708–1710 are executed, in which a server program (snboot.exe) is run to load the correct version of Slownet.exe onto the client, (depending on the client's operating system), and then run it from the client. Step 1172 tests the network speed, which continues the logon discovery and installation process if greater than forty kilobits per second, cancels it if less, and if it does not know, continues the process via step 1714 if non-RAS (dial-up) or cancels it if RAS is detected.

If the process continues, step 1800 looks for a first SMS boot program, SMSboot1.exe (Boot1), on the client, and runs it at step 1802 if found locally. Otherwise, step 1804 runs Boot1 from the logon point, e.g., the domain controller 86 that has been configured for logon discovery. As generally represented in step 1806, Boot1 locates the local SMS directory, identifies the operating system to determine a correct version of Boot32wn.exe (Bboot2), checks the local version of Boot2 to determine if it needs to be copied or updated from the server, and creates a Boot2 ".ini" file with Boot2 parameters (e.g., the path to the logon point and a client installation directory). Boot1 then starts Boot2, after which Boot1 terminates.

Figure 19:
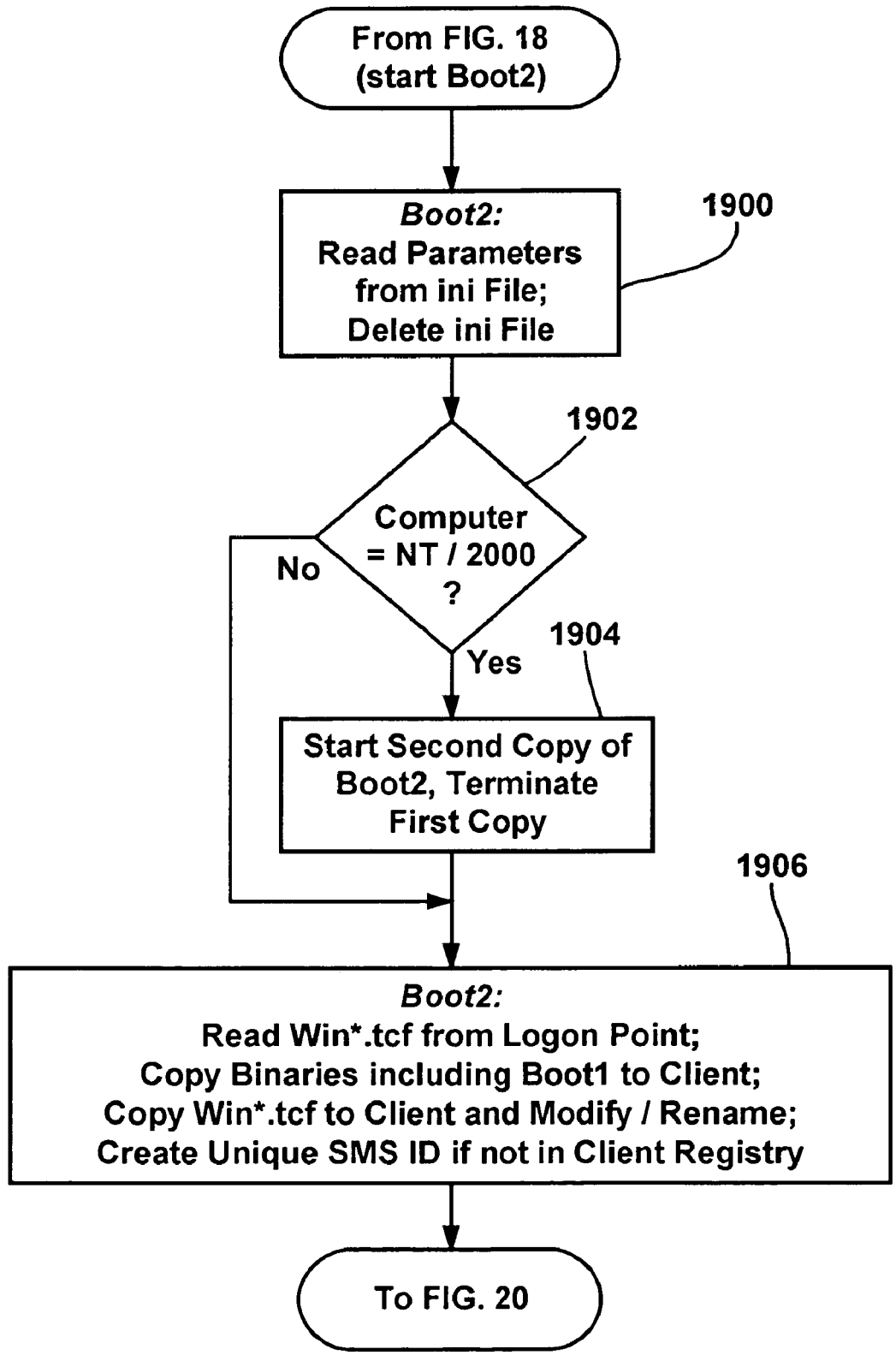

FIG. 19 generally represents the steps performed by Boot2, beginning at step 1900 wherein the parameters saved by Boot1 are read from the .ini file, and then the .ini file is deleted. If the computer is a Windows® NT/2000 computer (step 1902), a second copy of Boot2 is started and the first copy of Boot2 is terminated to free the command shell window from waiting on subsequent processes.

At step 1906, Boot2 reads a file, Win*.tcf (which includes data discovery properties to be discovered) from the logon point 86, copies binary executable files including SMSboot1.exe and CliCore.exe from the logon point to the client's SMS core directory, copies, modifies and renames Win*.tcf (to Temp.tcf) to the client, and creates an SMS unique identifier if one does not already exist in the client registry.

Figure 20:
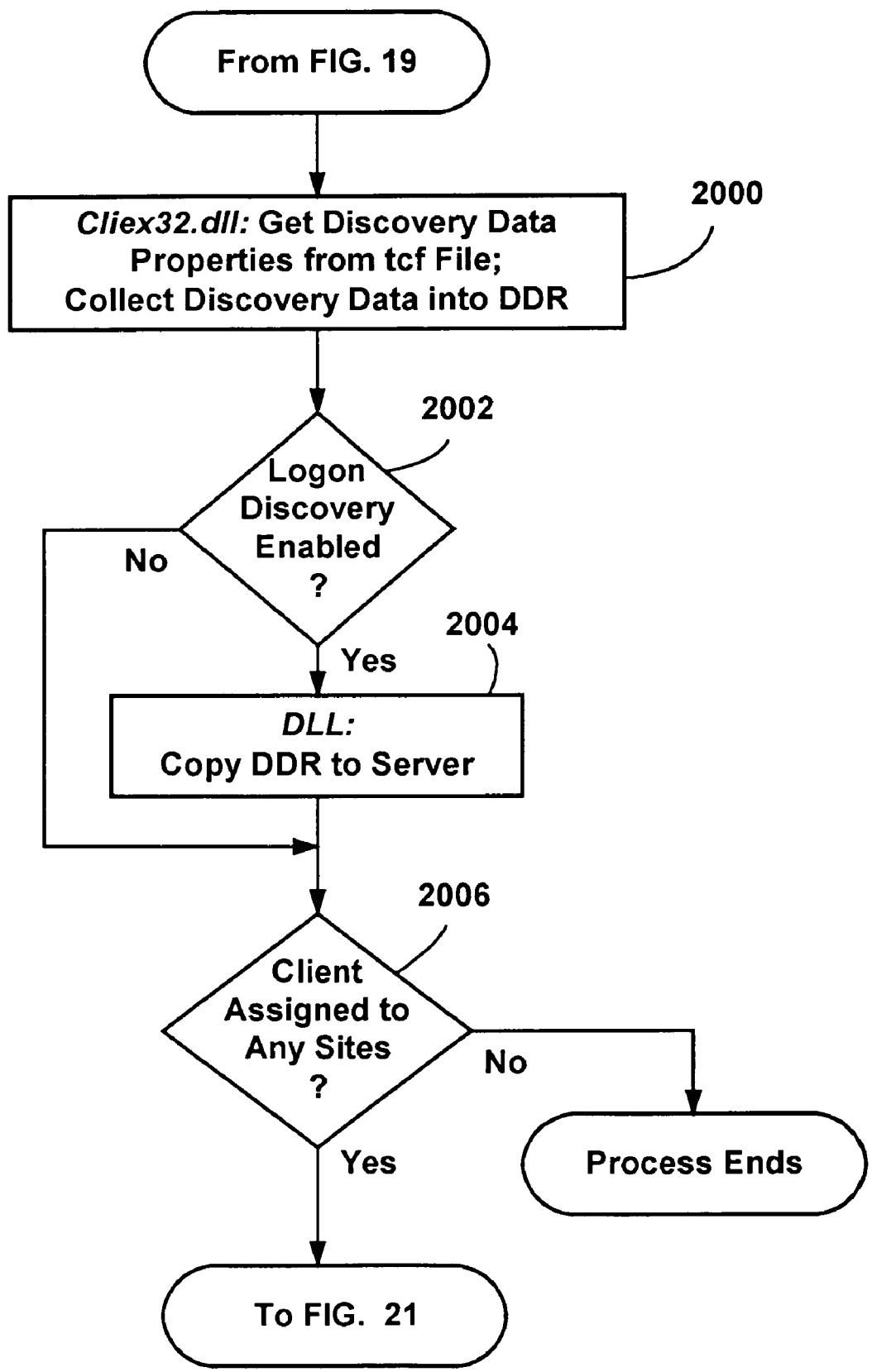

FIG. 19 continues to step 2000 of FIG. 20 which represents the running of another client component to perform logon discovery, Cliex32.dll, which reads the Temp.tcf file to get a list of the discovery data properties that should be discovered. Cliedx32.dll then collects discovery data into a DDR by making a separate call for each property to be discovered, and creates a DDR on the client with the property names and values therein. Then, at step 2002, if logon discovery is enabled, (in the SMS administrator console), the DDR is copied to a server at step 2004. Step 2006 then tests whether the client is assigned to any sites, and if not, the process ends, otherwise the process continues to step 2100 of FIG. 21.

Figure 21:
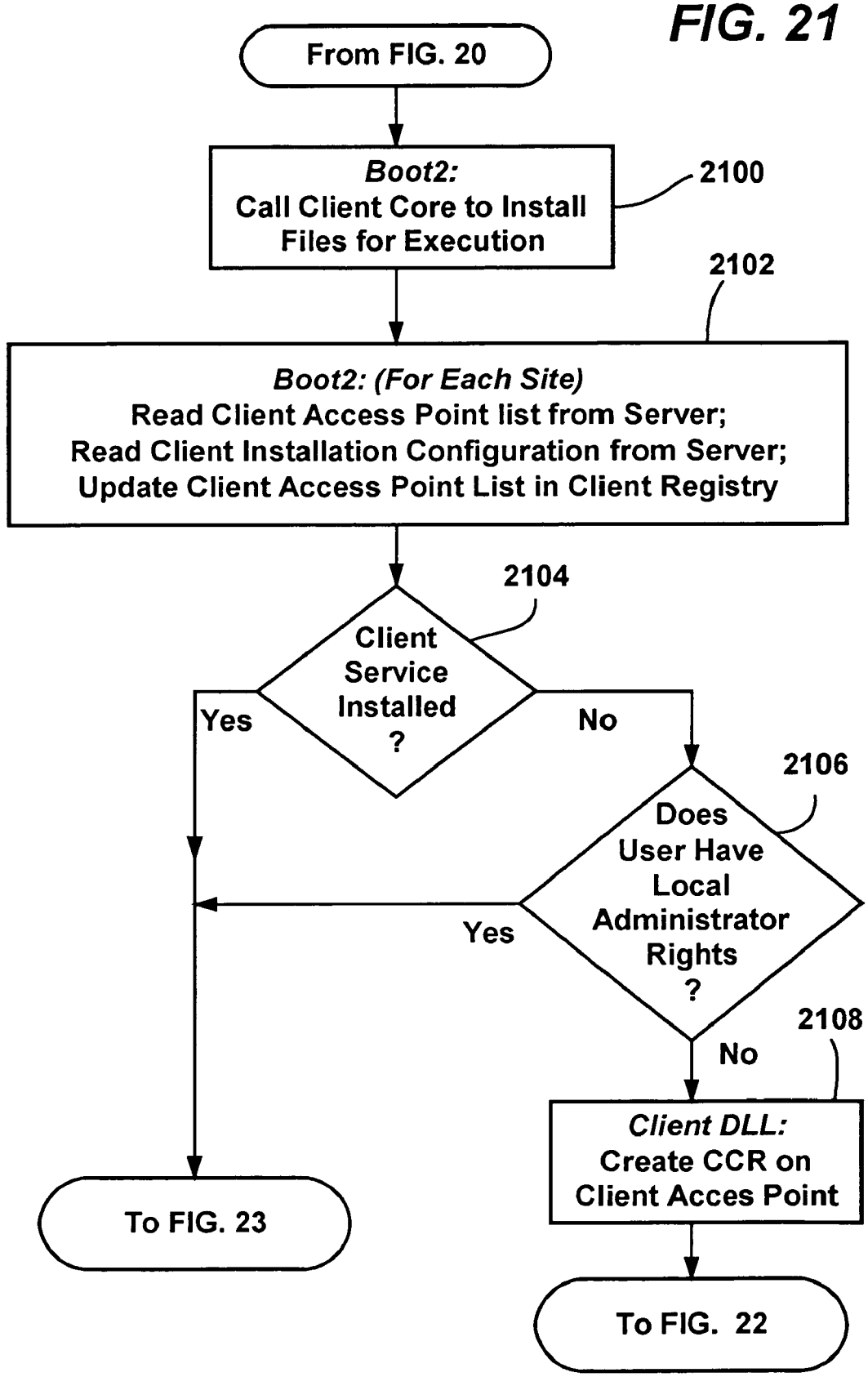

At FIG. 21, Boot2 resumes by calling a client core installation program (Clicore.exe) to install the files needed for client installation. For each assigned site, the client access point list is read from the server, the client installation configuration is read from the server, and the list of client access points in the client registry is updated based on the client access point list. If at step 2104 the client service is already installed (with Ccim32.dll registered to start), the process continues to FIG. 23 as described below. If not, step 2104 branches to step 2106 to determine whether the user has local administrator rights, whereby if so, the Boot2 process similarly continues to FIG. 23 as described below. If not, however, the process (via Cliex32.dll) creates a CCR on the client access point for this computer system.

Figure 22:
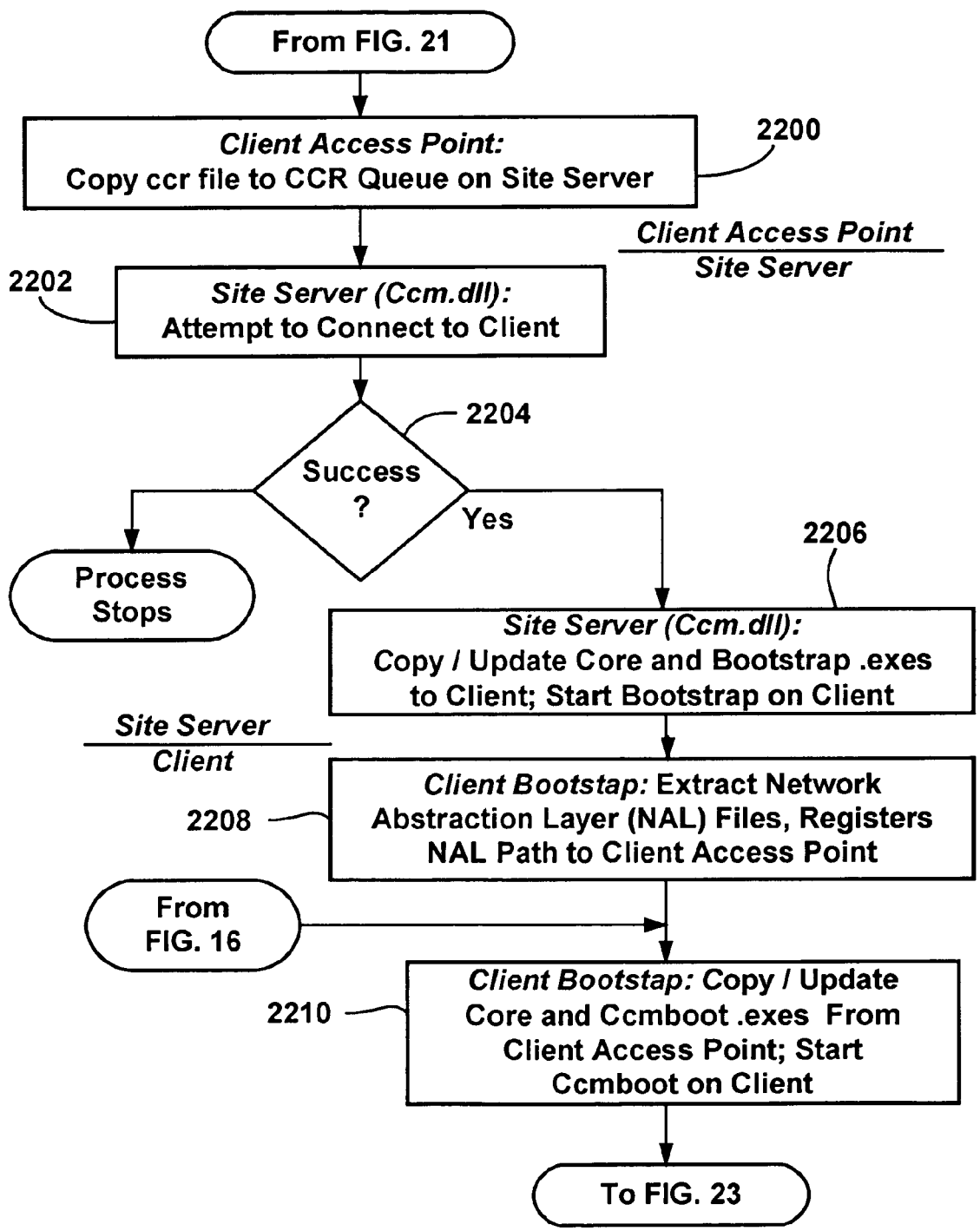
FIGS. 22–25 comprise a flow diagram generally representing client installation, including general steps performed in remote client installation in accordance with an aspect of the present invention.
Figure 23:
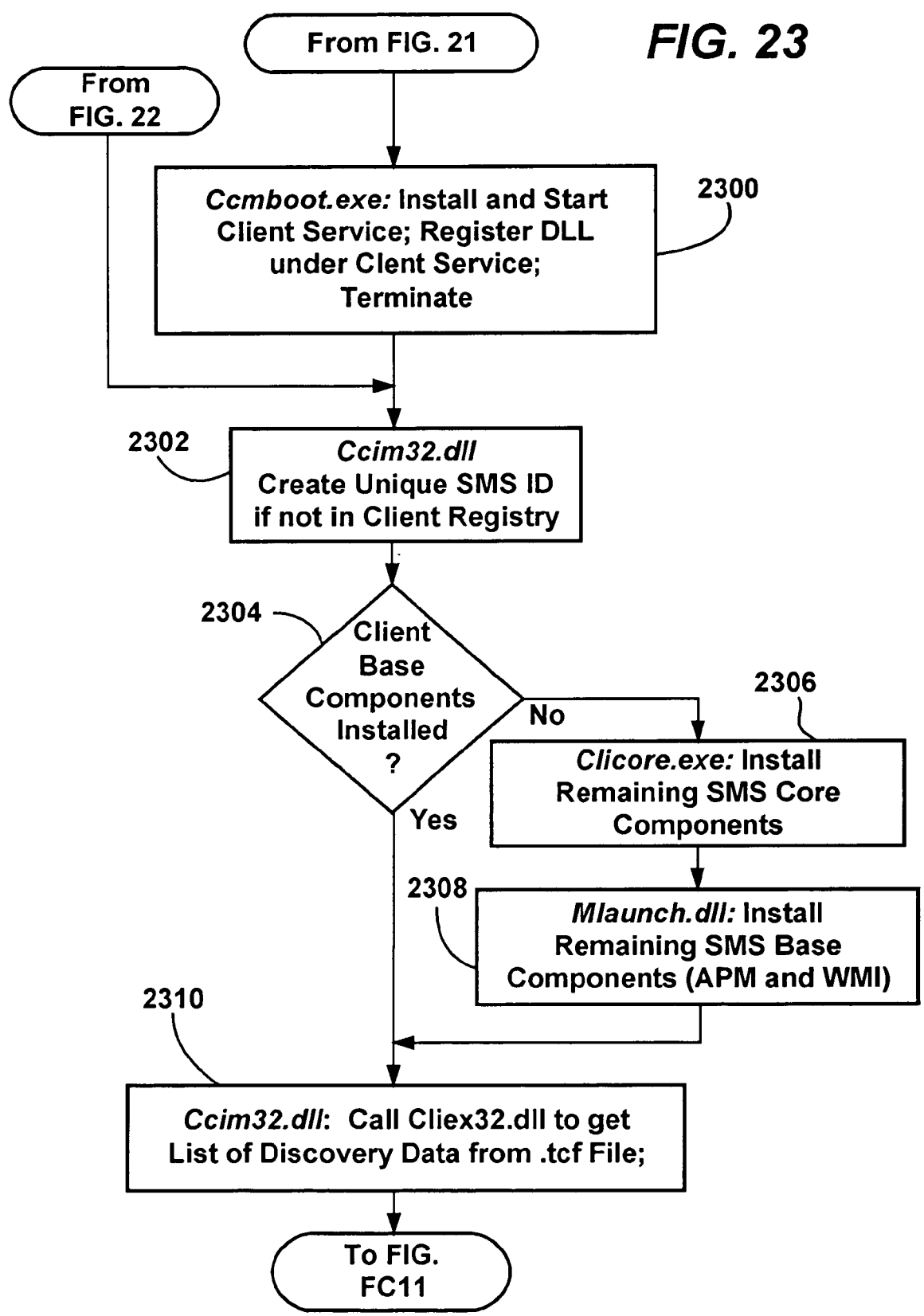

FIG. 22 generally describes the handling of a CCR to perform client installation, following the CCR having been copied from the client access point (e.g., 114) to the site server 64 at step 2200. At step 2202, the site server, via a component (Ccm.dll) of the CCM process, attempts to connect to the client. If unsuccessful, the process stops, e.g., the CCR 130 is put into the retry queue 138 (FIG. 12) unless the threshold retry time is achieved, as described above with reference to FIG. 16. If the connection is successful, at step 2206 the CCM process copies and/or updates the bootstrap service (Ccmcore.exe and Ccmbtldr.exe) on the client, and then starts the bootstrap process. The client machine's bootstrap service (Ccmbtldr) performs step 2208, which calls Ccmcore.exe to extract the network abstraction layer (NAL) Files 142 (FIG. 13), and register a NAL path to the client access point 114. At this time, the logon installation procedure has reached the same point as the above-described remote client installation procedure.

At step 2210, the client bootstrap service continues by copying and/or updating the Clicore.exe and Ccmboot.exe files from the client access point 114, and then starting Ccmboot. As represented by step 2300 of FIG. 23, Ccmboot installs and starts the SMS client service 128, registers Ccim32.dll under the SMS client service (and records the action in the Ccim32 log), and terminates.

At step 2302, Ccim32.dll creates an SMS unique identifier of one does not already exist in the client registry, and at step 2304, continues the installation by looking to determine whether certain client base components 144 are installed. If already installed, step 2304 branches ahead to step 2310, otherwise Clicore.exe installs some remaining SMS core components at step 2306, and executes Mlaunch.dll at step 2308 to install the SMS base components APM and WMI. At step 2310, Ccim32.dll calls Cliex32.dll to get the list of discovery data from the .tcf file.

Figure 24:
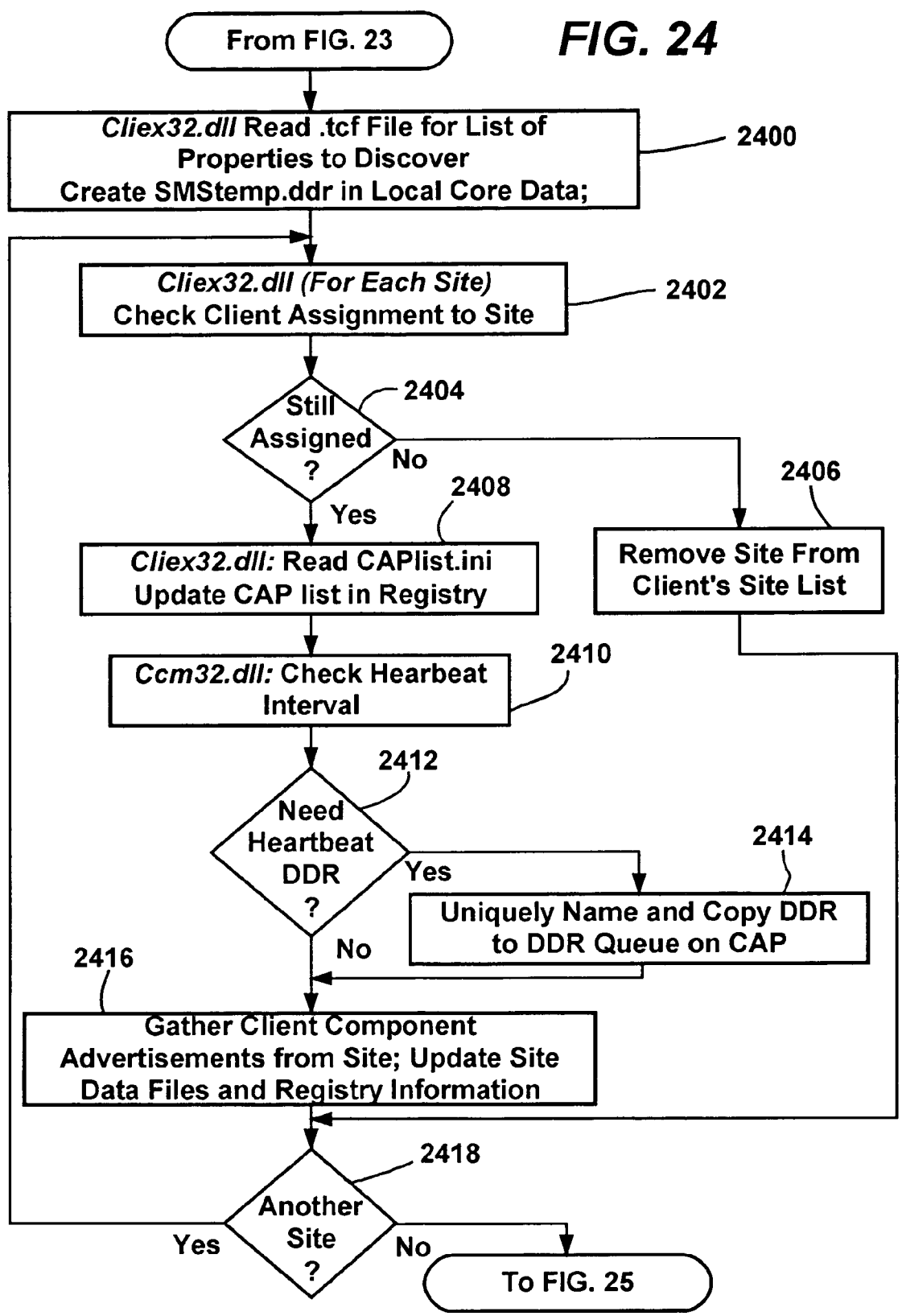

At step 2400 of FIG. 24, Cliex32.dll reads the Temp.tcf file to get a list of the discovery data properties that should be discovered, collects discovery data into a DDR, and creates a DDR on the client with the property names and values therein. Then, beginning at step 2402, for each listed site, the client assignment to that site is checked. If not assigned at step 2404, the site is removed from the client's site list at step 2406, and the process branches ahead to step 2418 which loops back until no more listed sites need to be checked.

If still assigned to the site, step 2404 branches to step 2408 where Cliex32.dll reads the CAPlist.ini file from the logon server in order to update the list of client access points in the local client registry. Step 2410 is also executed to check the heartbeat interval, and, if a heartbeat DDR is needed (step 2412), Cliex32.dll determines a unique name for the DDR and copies the DDR to a DDR queue (Ddr.box) on the client access point 114. Step 2416 represents Cliex32.dll gathering client component advertisements from the site, and appropriately updating the client machine's site data files and registry information. Step 2418 then repeats the process for each site to which the client is assigned.

Figure 25:
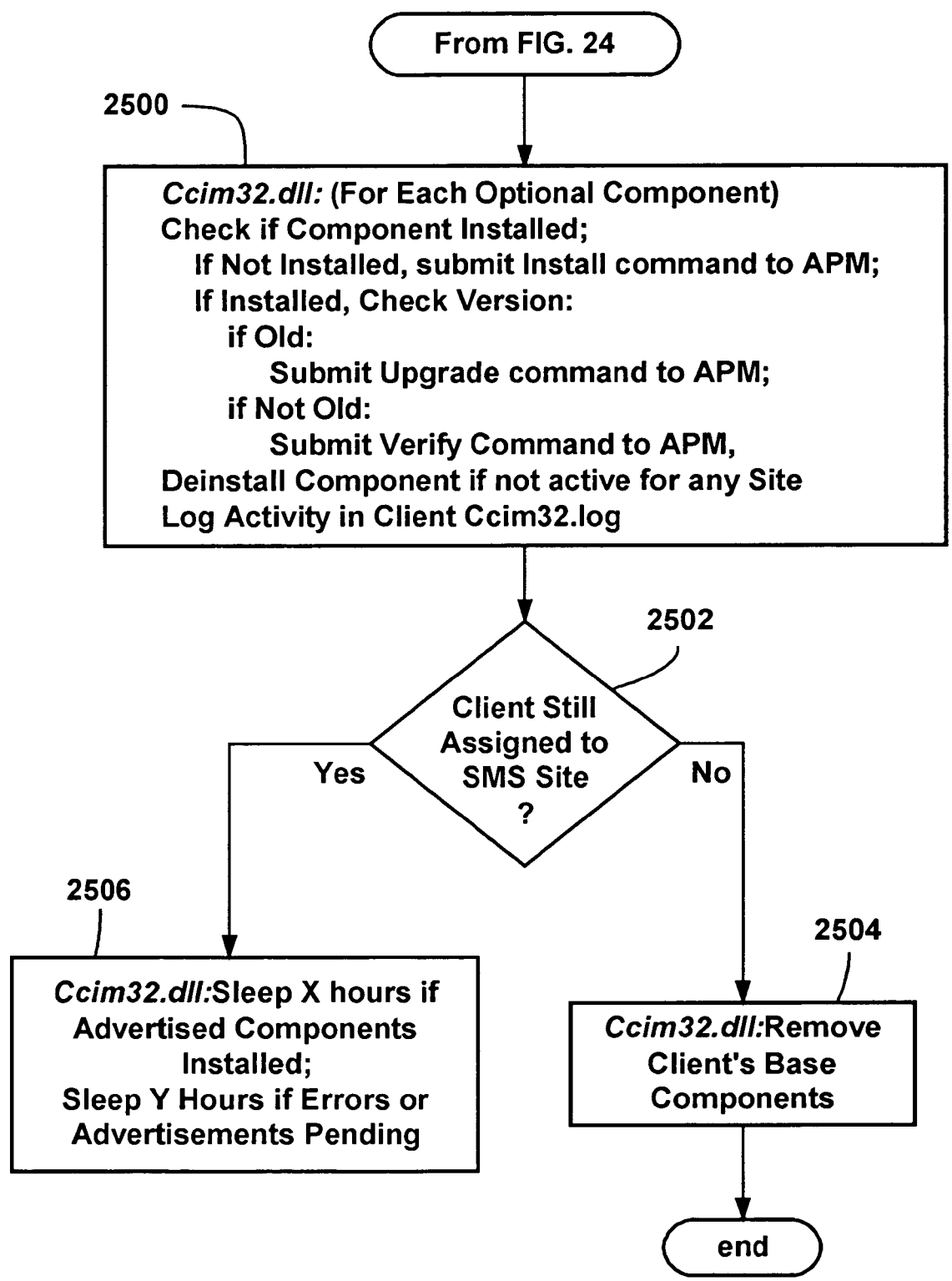

Lastly, FIG. 25 represents Ccim32.dll checking the status of each optional component for possible installation, updating or deinstallation thereof, and also checking whether the machine is still a client of an SMS site. If any optional component is assigned but not installed, an install command is submitted to the APM base component therefor. If it is installed, the component's version is checked, and if an older version is found, the process submits an upgrade command to APM, otherwise a verify command is submitted. If an optional component on the machine is not active for any site to which the client is assigned, the component is deinstalled. The activity is then logged in the client ccim32 log. Once the components have been checked, step 2502 checks to determine whether the client is still assigned to an SMS site. If not, the Ccim32.dll removes the client's base components and ends the installation process. If still assigned to an SSM site, Ccim32.dll sleeps for a period of time (e.g., twenty-three hours) if all advertised components are installed, otherwise Ccim32.dll sleeps for a generally lesser period of time (e.g., one hour if any errors or advertisements are pending.

As can be seen from the foregoing detailed description, there is provided a method and system for remote client installation of system management software. The method and system are automatic, and thus do not rely on user intervention. The method and system enable remote client installation in a manner that overcomes the problems in the prior art.

While the invention is susceptible to various modifications and alternative constructions, certain illustrated embodiments thereof are shown in the drawings and has been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer network, a method for installing software onto a remote client machine, comprising:
   initiating a connection at a server to the client machine;
   transmitting an installation service that installs software, the installation service transmitted from the server to the client machine based on the connection initiated by the server; and
   executing the installation service on the client machine, the executing independent of any installation program previously installed on the client machine, the executing further comprising:
      running a bootstrap service to connect the client machine to a second server; and
      transmitting additional software from the second server for installing on the client machine.

2. The method of claim 1 wherein initiating a connection to the client machine includes discovering the client machine.

3. The method of claim 2 further comprising, evaluating a discovery information associated with the client machine.

4. The method of claim 3 wherein the discovery information associated with the client machine is evaluated against a set of rules.

5. The method of claim 3 wherein evaluating the discovery information associated with the client machine includes determining whether the client machine is included or excluded with respect to a set that includes machines on which the installation service is installed.

6. The method of claim 3 wherein evaluating the discovery information associated with the client machine includes checking the operating system of the client machine.

7. The method of claim 3 wherein evaluating the discovery information associated with the client machine includes checking at least one property of the client machine.

8. The method of claim 3 wherein evaluating the discovery information associated with the client machine includes determining whether certain software is already installed on the client machine.

9. The method of claim 1 wherein initiating a connection to the client machine includes creating a configuration request for the client machine.

10. The method of claim 9 wherein initiating a connection to the client machine includes processing the configuration request.

11. The method of claim 9 further comprising queuing the configuration request.

12. The method of claim 11 wherein initiating a connection to the client machine includes dequeuing and processing the configuration request.

13. The method of claim 1 further comprising, installing optional components on the client machine by executing the additional software.

14. A computer-readable medium having computer-executable instructions for performing the method of claim 1.

15. In a computer network, a system for selectively installing management software onto remote client machine, comprising:
   a data manager for evaluating information associated with a plurality of discovered remote client machines, and for selecting one of the remote client machines as a selected client machine;
   a configuration manager for initiating a connection to the selected client machine; and
   an installation service transmitted by the configuration manager to the selected client machine, the installation service installing at least part of the management software on the selected client machine, the installing independent of any installation program previously installed on the client machine, wherein the installation service may be operable to execute a bootstrap service to connect the client machine to a second server and to coordinate transmission of additional software from the second server for installing on the client machine.

16. The system of claim 15 wherein the data manager selects the client machine by evaluating a discovery information associated with the client machine against criteria.

17. The system of claim 16 wherein at least part of the discovery information associated with the client machine is maintained in a data discovery record.

18. The system of claim 15 wherein the data manager produces a configuration request for the selected client machine, and wherein the configuration manager receives the configuration request.

19. The system of claim 18 wherein the configuration request comprises a client configuration record.

20. The system of claim 18 wherein the configuration request is placed in a queue by the data manager and removed from the queue by the configuration manager.

21. The system of claim 20 further comprising a retry queue.

22. The system of claim 15 wherein the additional software is downloaded from a client access point.

23. The system of claim 15 wherein the bootstrap service is configured to connect the client machine to another server.

24. The system of claim 23 wherein the other server transmits additional software for installing on the client machine, and wherein the additional software installs optional components on the client machine.

25. In a computer network, a method for installing management software onto a remote client machine, comprising:
   attempting to initiate a connection at a server to the client machine, and if successful:
      transmitting an installation service from the server to the client machine, and executing the installation service, the executing independent of any installation program previously installed on the client machine;

and if not successful:
secondarily attempting to initiate a connection at the server to the client machine, and if successful, transmitting an installation service from the server to the client machine, and executing the installation service, the executing independent of any installation program previously installed on the client machine,
wherein the installation service comprises a bootstrap service, such that executing the installation service includes running the bootstrap service to connect the client machine to another server, and transmitting additional software from the other server to installing on the client machine.

26. The method of claim 25 further comprising, evaluating a discovery information associated with the client machine.

27. The method of claim 25 wherein attempting to initiate a connection to the client machine includes, associating a configuration request with the client machine.

28. The method of claim 27 wherein attempting to initiate a connection to the client machine includes queuing the configuration request, dequeuing the configuration request, and processing the configuration request.

29. The method of claim 28 wherein the attempt to initiate a connection to the client machine is unsuccessful, and further comprising, secondarily queuing the configuration request.

30. The method of claim 29 wherein secondarily attempting to initiate a connection to the client machine includes dequeuing the secondarily queued configuration request.

31. The method of claim 27 further comprising, modifying the configuration request by writing data thereto indicative of the installation service executing on the client machine.

32. The method of claim 31 further comprising, queuing the configuration request having the data written thereto.

33. The method of claim 32 further comprising, dequeuing the configuration request having the data written thereto, determining if the installation service executed successfully, and if not, reattempting execution of the installation service.

34. The method of claim 33 wherein reattempting execution of the installation service includes removing the data written to the configuration request.

35. The method of claim 34 further comprising queueing the configuration request having the data removed therefrom.

36. The method of claim 25 further comprising, installing optional components on the client machine by executing the additional software.

37. The method of claim 25 wherein secondarily attempting to initiate the connection includes delaying for a period of time.

38. A computer-readable medium having computer-executable instructions for performing the method of claim 25.

39. A method for installing software onto a client machine, comprising:
determining whether a user that is logged out the client machine has sufficient security rights to have software installed on the client machine, and if so:
executing a process at the client machine to install the software;
and if not:
initiating a connection at a server to the client machine, transmitting an installation services from the server to the client machine based on the connection, and executing the installation service to install the software wherein the installation service comprises a bootstrap service, such that execution the installation service includes running the bootstrap service to connect the client machine to another server, and transmitting additional software from the other server for installing on the client machine, the executing the installation service independent of any installation program previously installed on the client machine.

40. The method of claim 39 further comprising, evaluating a discovery information associated with the client machine.

41. The method of claim 39 wherein initiating a connection to the client machine includes associating a configuration request with the client machine.

42. The method of claim 41 wherein initiating a connection to the client machine includes, queuing the configuration request, dequeuing the configuration request, and processing the configuration request.

43. The method of claim 41 further comprising, modifying the configuration request by writing data thereto indicative of the installation service executing on the client machine.

44. The method of claim 43 further comprising, queuing the configuration request having the data written thereto.

45. The method of claim 44 further comprising, dequeuing the configuration request having the data written thereto, determining if the installation service executed successfully, and if not, reattempting execution of the installation service.

46. The method of claim 39 further comprising, installing optional components on the client machine by executing the additional software.

47. A computer-readable medium having computer-executable instructions for performing the method of claim 39.

* * * * *

UNITED STATES PATENT AND TRADEMARK OFFICE
CERTIFICATE OF CORRECTION

| | |
|---|---|
| PATENT NO. | : 6,966,060 B1 |
| APPLICATION NO. | : 09/599156 |
| DATED | : November 15, 2005 |
| INVENTOR(S) | : Jeff Young et al. |

It is certified that error appears in the above-identified patent and that said Letters Patent is hereby corrected as shown below:

In column 1, line 27, after "install" delete "and" and insert -- the --, therefor.

In column 2, line 10, delete "of" and insert -- to --, therefor.

In column 5, line 29, delete "2–4" and insert -- 2–14 --, therefor.

In column 8, line 59, after "administrator)" delete "or" and insert -- of --, therefor.

In column 8, line 66, delete "(fi" and insert -- if --, therefor.

In column 9, line 1, delete "numerated" and insert -- enumerated --, therefor.

In column 9, line 7, delete "DCM" and insert -- DDM --, therefor.

In column 9, line 37, after "may be made" delete "may be made".

In column 9, line 50, delete "1501" and insert -- 1510 --, therefor.

In column 10, line 54, delete "Ccmore.exe)" and insert -- Ccmcore.exe) --, therefor.

In column 11, line 6, delete "1172" and insert -- 1712 --, therefor.

In column 11, line 43, delete "Cliedx32.dll" and insert -- Cliex32.dll --, therefor.

In column 12, line 25, delete "of" and insert -- if --, therefor.

In column 13, line 5, delete "SSM" and insert -- SMS --, therefor.

In column 14, line 15, in Claim 15, delete "machine," and insert -- machines, --, therefor.

In column 15, line 12, in Claim 25, after "server" delete "to" and insert -- for --, therefor.

In column 16, line 5, in Claim 39, delete "out" and insert -- onto --, therefor.

UNITED STATES PATENT AND TRADEMARK OFFICE
CERTIFICATE OF CORRECTION

PATENT NO. : 6,966,060 B1
APPLICATION NO. : 09/599156
DATED : November 15, 2005
INVENTOR(S) : Jeff Young et al.

It is certified that error appears in the above-identified patent and that said Letters Patent is hereby corrected as shown below:

In column 16, line 13, in Claim 39, delete "services" and insert -- service --, therefor.

In column 16, line 17, in Claim 39, delete "execution" and insert -- executing --, therefor.

In column 16, line 21, in Claim 39, after "machine," delete "the".

Signed and Sealed this

Twenty-second Day of September, 2009

David J. Kappos
*Director of the United States Patent and Trademark Office*